US011644799B2

(12) United States Patent
Lake et al.

(10) Patent No.: US 11,644,799 B2
(45) Date of Patent: May 9, 2023

(54) SYSTEMS, ARTICLES AND METHODS FOR WEARABLE ELECTRONIC DEVICES EMPLOYING CONTACT SENSORS

(71) Applicant: META PLATFORMS TECHNOLOGIES, LLC, Menlo Park, CA (US)

(72) Inventors: Stephen Lake, Kitchener (CA); Matthew Bailey, Kitchener (CA)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 15/882,858

(22) Filed: Jan. 29, 2018

(65) Prior Publication Data

US 2018/0150033 A1 May 31, 2018

Related U.S. Application Data

(63) Continuation of application No. 14/505,836, filed on Oct. 3, 2014, now abandoned.
(Continued)

(51) Int. Cl.
*G04G 21/08* (2010.01)
*G06F 3/01* (2006.01)
(Continued)

(52) U.S. Cl.
CPC ............ *G04G 21/08* (2013.01); *G06F 3/011* (2013.01); *G06F 3/014* (2013.01); *G06F 3/015* (2013.01);
(Continued)

(58) Field of Classification Search
CPC . G06F 3/01; G06F 3/011; G06F 3/014; G06F 3/015; G06F 3/017; G06F 3/044; G06F 3/0484; G04G 21/08; G04G 17/08
(Continued)

(56) References Cited

U.S. PATENT DOCUMENTS 1,411,995 A 4/1922 Dull
3,408,133 A 10/1968 Lee
(Continued)

FOREIGN PATENT DOCUMENTS

CN 102246125 A 11/2011
CN 110300542 A 10/2019
(Continued)

OTHER PUBLICATIONS

Sato et al. "Touche: Enhancing Touch Interaction on Humans, Screens, Liquids, and Everyday Objects" (Presented at CHI '12, May 5-10, 2012) (Year: 2012).*
(Continued)

*Primary Examiner* — Jason M Mandeville
(74) *Attorney, Agent, or Firm* — Morgan, Lewis & Bockius LLP

(57) ABSTRACT

Wearable electronic devices that employ one or more contact sensors (e.g., capacitive sensors and/or biometric sensors) are described. Contact sensors include electromyography sensors and/or capacitive touch sensors. Capacitive touch sensors include single-frequency capacitive touch sensors, recently-proposed swept frequency capacitive touch sensors, and a generalized version of swept frequency capacitive touch sensors referred to as multi-frequency capacitive touch sensors. The contact sensors are integrated into various devices, including generic watchstraps that may be substituted for the existing watchstrap in any wristwatch design, generic watch back-plates that may be substituted for the existing back-plate in any wristwatch design, and wearable electromyography devices that provide gesture-based control in a human-electronics interface.

20 Claims, 6 Drawing Sheets

Related U.S. Application Data

(60) Provisional application No. 61/897,097, filed on Oct. 29, 2013, provisional application No. 61/891,694, filed on Oct. 16, 2013, provisional application No. 61/887,812, filed on Oct. 7, 2013, provisional application No. 61/887,193, filed on Oct. 4, 2013.

(51) Int. Cl.
    *G04G 17/08* (2006.01)
    *G06F 3/044* (2006.01)

(52) U.S. Cl.
    CPC ............ *G06F 3/017* (2013.01); *G04G 17/08* (2013.01); *G06F 3/044* (2013.01)

(58) Field of Classification Search
    USPC .................. 345/156, 158, 173, 174; 715/863
    See application file for complete search history.

(56) References Cited

U.S. PATENT DOCUMENTS

| | | |
|---|---|---|
| 3,580,243 A | 5/1971 | Johnson et al. |
| 3,620,208 A | 11/1971 | Higley |
| 3,712,716 A | 1/1973 | Cornsweet et al. |
| 3,735,425 A | 5/1973 | Hoshall et al. |
| 3,880,146 A | 4/1975 | Everett et al. |
| 4,055,168 A | 10/1977 | Miller et al. |
| 4,602,639 A | 7/1986 | Hoogendoorn et al. |
| 4,705,408 A | 11/1987 | Jordi |
| 4,817,064 A | 3/1989 | Milles |
| 4,896,120 A | 1/1990 | Kamil |
| 4,978,213 A | 12/1990 | El Hage |
| 5,003,978 A | 4/1991 | Dunseath, Jr. |
| D322,227 S | 12/1991 | Warhol |
| 5,081,852 A | 1/1992 | Cox |
| 5,103,323 A | 4/1992 | Magarinos et al. |
| 5,231,674 A | 7/1993 | Cleveland et al. |
| 5,251,189 A | 10/1993 | Thorp |
| D348,660 S | 7/1994 | Parsons |
| 5,445,869 A | 8/1995 | Ishikawa et al. |
| 5,462,065 A | 10/1995 | Cusimano |
| 5,467,104 A | 11/1995 | Furness, III et al. |
| 5,482,051 A | 1/1996 | Reddy et al. |
| 5,589,956 A | 12/1996 | Morishima et al. |
| 5,596,339 A | 1/1997 | Furness, III et al. |
| 5,605,059 A | 2/1997 | Woodward |
| 5,625,577 A | 4/1997 | Kunii et al. |
| 5,683,404 A | 11/1997 | Johnson |
| 5,742,421 A | 4/1998 | Wells et al. |
| 6,005,548 A | 12/1999 | Latypov et al. |
| 6,008,781 A | 12/1999 | Furness, III et al. |
| 6,009,210 A | 12/1999 | Kand |
| 6,027,216 A | 2/2000 | Guyton et al. |
| 6,032,530 A | 3/2000 | Hock |
| D422,617 S | 4/2000 | Simioni |
| 6,066,794 A | 5/2000 | Longo |
| 6,184,847 B1 | 2/2001 | Fateh et al. |
| 6,236,476 B1 | 5/2001 | Son et al. |
| 6,238,338 B1 | 5/2001 | DeLuca et al. |
| 6,244,873 B1 | 6/2001 | Hill et al. |
| 6,317,103 B1 | 11/2001 | Furness, III et al. |
| 6,377,277 B1 | 4/2002 | Yamamoto |
| D459,352 S | 6/2002 | Giovanniello |
| 6,411,843 B1 | 6/2002 | Zarychta |
| 6,487,906 B1 | 12/2002 | Hock |
| 6,510,333 B1 | 1/2003 | Licata et al. |
| 6,527,711 B1 | 3/2003 | Stivoric et al. |
| 6,619,836 B1 | 9/2003 | Silvant et al. |
| 6,639,570 B2 | 10/2003 | Furness, III et al. |
| 6,658,287 B1 | 12/2003 | Litt et al. |
| 6,720,984 B1 | 4/2004 | Jorgensen et al. |
| 6,743,982 B2 | 6/2004 | Biegelsen et al. |
| 6,771,294 B1 | 8/2004 | Pulli et al. |
| 6,774,885 B1 | 8/2004 | Even-Zohar |
| 6,807,438 B1 | 10/2004 | Brun Del Re et al. |
| D502,661 S | 3/2005 | Rapport |
| D502,662 S | 3/2005 | Rapport |
| 6,865,409 B2 | 3/2005 | Getsla et al. |
| D503,646 S | 4/2005 | Rapport |
| 6,880,364 B1 | 4/2005 | Vidolin et al. |
| 6,901,286 B1 | 5/2005 | Sinderby et al. |
| 6,927,343 B2 | 8/2005 | Watanabe et al. |
| 6,942,621 B2 | 9/2005 | Avinash et al. |
| 6,965,842 B2 | 11/2005 | Rekimoto |
| 6,972,734 B1 | 12/2005 | Ohshima et al. |
| 6,984,208 B2 | 1/2006 | Zheng |
| 7,022,919 B2 | 4/2006 | Brist et al. |
| 7,028,507 B2 | 4/2006 | Rapport |
| 7,086,218 B1 | 8/2006 | Pasach |
| 7,089,148 B1 | 8/2006 | Bachmann et al. |
| D535,401 S | 1/2007 | Travis et al. |
| 7,173,437 B2 | 2/2007 | Hervieux et al. |
| 7,209,114 B2 | 4/2007 | Radley-Smith |
| D543,212 S | 5/2007 | Marks |
| 7,265,298 B2 | 9/2007 | Maghribi et al. |
| 7,271,774 B2 | 9/2007 | Puuri |
| 7,333,090 B2 | 2/2008 | Tanaka et al. |
| 7,351,975 B2 | 4/2008 | Brady et al. |
| 7,450,107 B2 | 11/2008 | Radley-Smith |
| 7,473,888 B2 | 1/2009 | Wine et al. |
| 7,491,892 B2 | 2/2009 | Wanger et al. |
| 7,517,725 B2 | 4/2009 | Reis |
| 7,558,622 B2 | 7/2009 | Tran |
| 7,574,253 B2 | 8/2009 | Edney et al. |
| 7,580,742 B2 | 8/2009 | Tan et al. |
| 7,596,393 B2 | 9/2009 | Jung et al. |
| 7,618,260 B2 | 11/2009 | Daniel et al. |
| 7,636,549 B2 | 12/2009 | Ma et al. |
| 7,640,007 B2 | 12/2009 | Chen et al. |
| 7,660,126 B2 | 2/2010 | Cho et al. |
| 7,684,105 B2 | 3/2010 | Lamontagne et al. |
| 7,747,113 B2 | 6/2010 | Mukawa et al. |
| 7,761,390 B2 | 7/2010 | Ford |
| 7,773,111 B2 | 8/2010 | Cleveland et al. |
| 7,787,946 B2 | 8/2010 | Stahmann et al. |
| 7,805,386 B2 | 9/2010 | Greer |
| 7,809,435 B1 | 10/2010 | Ettare et al. |
| 7,844,310 B2 | 11/2010 | Anderson |
| D628,616 S | 12/2010 | Yuan |
| 7,850,306 B2 | 12/2010 | Uusitalo et al. |
| 7,870,211 B2 | 1/2011 | Pascal et al. |
| D633,939 S | 3/2011 | Puentes et al. |
| D634,771 S | 3/2011 | Fuchs |
| 7,901,368 B2 | 3/2011 | Flaherty et al. |
| 7,925,100 B2 | 4/2011 | Howell et al. |
| 7,948,763 B2 | 5/2011 | Chuang |
| D640,314 S | 6/2011 | Yang |
| D643,428 S | 8/2011 | Janky et al. |
| D646,192 S | 10/2011 | Woode |
| D649,177 S | 11/2011 | Cho et al. |
| 8,054,061 B2 | 11/2011 | Prance et al. |
| D654,622 S | 2/2012 | Hsu |
| 8,120,828 B2 | 2/2012 | Schwerdtner |
| 8,170,656 B2 | 5/2012 | Tan et al. |
| 8,179,604 B1 | 5/2012 | Prada Gomez et al. |
| 8,188,937 B1 | 5/2012 | Amafuji et al. |
| 8,190,249 B1 | 5/2012 | Gharieb et al. |
| D661,613 S | 6/2012 | Demeglio |
| 8,203,502 B1 | 6/2012 | Chi et al. |
| 8,207,473 B2 | 6/2012 | Axisa et al. |
| 8,212,859 B2 | 7/2012 | Tang et al. |
| D667,482 S | 9/2012 | Healy et al. |
| D669,522 S | 10/2012 | Klinar et al. |
| D669,523 S | 10/2012 | Wakata et al. |
| D671,590 S | 11/2012 | Klinar et al. |
| 8,311,623 B2 | 11/2012 | Sanger |
| 8,348,538 B2 | 1/2013 | Van Loenen et al. |
| 8,351,651 B2 | 1/2013 | Lee |
| 8,355,671 B2 | 1/2013 | Kramer et al. |
| 8,384,683 B2 | 2/2013 | Luo |
| 8,386,025 B2 | 2/2013 | Hoppe |
| 8,389,862 B2 | 4/2013 | Arora et al. |
| 8,421,634 B2 | 4/2013 | Tan et al. |
| 8,427,977 B2 | 4/2013 | Workman et al. |

(56) References Cited

U.S. PATENT DOCUMENTS

| | | |
|---|---|---|
| D682,343 S | 5/2013 | Waters |
| D682,727 S | 5/2013 | Bulgari |
| 8,435,191 B2 | 5/2013 | Barboutis et al. |
| 8,437,844 B2 | 5/2013 | Syed Momen et al. |
| 8,447,704 B2 | 5/2013 | Tan et al. |
| D685,019 S | 6/2013 | Li |
| 8,467,270 B2 | 6/2013 | Gossweiler, III et al. |
| 8,469,741 B2 | 6/2013 | Oster et al. |
| D687,087 S | 7/2013 | Iurilli |
| 8,484,022 B1 | 7/2013 | Vanhoucke |
| D689,862 S | 9/2013 | Liu |
| D692,941 S | 11/2013 | Klinar et al. |
| 8,591,411 B2 | 11/2013 | Banet et al. |
| D695,333 S | 12/2013 | Farnam et al. |
| D695,454 S | 12/2013 | Moore |
| 8,620,361 B2 | 12/2013 | Bailey et al. |
| 8,624,124 B2 | 1/2014 | Koo et al. |
| 8,634,119 B2 | 1/2014 | Bablumyan et al. |
| D701,555 S | 3/2014 | Markovitz et al. |
| 8,666,212 B1 | 3/2014 | Amirparviz |
| 8,702,629 B2 | 4/2014 | Giuffrida et al. |
| 8,704,882 B2 | 4/2014 | Turner |
| D704,248 S | 5/2014 | DiChiara |
| 8,718,980 B2 | 5/2014 | Garudadri et al. |
| 8,743,052 B1 | 6/2014 | Keller et al. |
| 8,744,543 B2 | 6/2014 | Li et al. |
| 8,754,862 B2 | 6/2014 | Zaliva |
| 8,777,668 B2 | 7/2014 | Ikeda et al. |
| D716,457 S | 10/2014 | Brefka et al. |
| D717,685 S | 11/2014 | Bailey et al. |
| 8,879,276 B2 | 11/2014 | Wang |
| 8,880,163 B2 | 11/2014 | Barachant et al. |
| 8,883,287 B2 | 11/2014 | Boyce et al. |
| 8,890,875 B2 | 11/2014 | Jammes et al. |
| 8,892,479 B2 | 11/2014 | Tan et al. |
| 8,895,865 B2 | 11/2014 | Lenahan et al. |
| D719,568 S | 12/2014 | Heinrich et al. |
| D719,570 S | 12/2014 | Heinrich et al. |
| 8,912,094 B2 | 12/2014 | Koo et al. |
| 8,914,472 B1 | 12/2014 | Lee et al. |
| 8,922,481 B1 | 12/2014 | Kauffman et al. |
| D723,093 S | 2/2015 | Li |
| 8,954,135 B2 | 2/2015 | Yuen et al. |
| D724,647 S | 3/2015 | Rohrbach |
| 8,970,571 B1 | 3/2015 | Wong et al. |
| 8,971,023 B2 | 3/2015 | Olsson et al. |
| 9,018,532 B2 | 4/2015 | Wesselmann et al. |
| 9,037,530 B2 | 5/2015 | Tan et al. |
| 9,086,687 B2 | 7/2015 | Park et al. |
| 9,092,664 B2 * | 7/2015 | Forutanpour ............ G06F 3/011 |
| D736,664 S | 8/2015 | Paradise et al. |
| 9,107,586 B2 | 8/2015 | Tran |
| D738,373 S | 9/2015 | Davies et al. |
| 9,135,708 B2 | 9/2015 | Ebisawa |
| 9,146,730 B2 | 9/2015 | Lazar |
| D741,855 S | 10/2015 | Park et al. |
| 9,170,674 B2 * | 10/2015 | Forutanpour ............ G06F 3/014 |
| D742,272 S | 11/2015 | Bailey et al. |
| D742,874 S | 11/2015 | Cheng et al. |
| D743,963 S | 11/2015 | Osterhout |
| 9,182,826 B2 | 11/2015 | Powledge et al. |
| 9,211,417 B2 | 12/2015 | Heldman et al. |
| 9,218,574 B2 | 12/2015 | Phillipps et al. |
| D747,714 S | 1/2016 | Erbeus |
| D747,759 S | 1/2016 | Ho |
| 9,235,934 B2 | 1/2016 | Mandella et al. |
| 9,240,069 B1 | 1/2016 | Li |
| D750,623 S | 3/2016 | Park et al. |
| D751,065 S | 3/2016 | Magi |
| 9,278,453 B2 | 3/2016 | Assad |
| 9,299,248 B2 | 3/2016 | Lake et al. |
| D756,359 S | 5/2016 | Bailey et al. |
| 9,329,694 B2 | 5/2016 | Slonneger |
| 9,341,659 B2 * | 5/2016 | Poupyrev ................ G06F 3/011 |
| 9,349,280 B2 | 5/2016 | Baldwin et al. |
| 9,351,653 B1 | 5/2016 | Harrison |
| D758,476 S | 6/2016 | Ho |
| D760,313 S | 6/2016 | Ho et al. |
| 9,367,139 B2 | 6/2016 | Ataee et al. |
| 9,372,535 B2 | 6/2016 | Bailey et al. |
| 9,389,694 B2 | 7/2016 | Ataee et al. |
| 9,393,418 B2 | 7/2016 | Giuffrida et al. |
| 9,402,582 B1 | 8/2016 | Parviz et al. |
| 9,408,316 B2 | 8/2016 | Bailey et al. |
| 9,418,927 B2 | 8/2016 | Axisa et al. |
| D766,895 S | 9/2016 | Choi |
| 9,439,566 B2 | 9/2016 | Arne et al. |
| D768,627 S | 10/2016 | Rochat et al. |
| 9,459,697 B2 | 10/2016 | Bedikian et al. |
| 9,472,956 B2 | 10/2016 | Michaelis et al. |
| 9,477,313 B2 | 10/2016 | Mistry et al. |
| D771,735 S | 11/2016 | Lee et al. |
| 9,483,123 B2 | 11/2016 | Aleem et al. |
| 9,529,434 B2 | 12/2016 | Choi et al. |
| D780,828 S | 3/2017 | Bonaventura et al. |
| D780,829 S | 3/2017 | Bonaventura et al. |
| 9,597,015 B2 | 3/2017 | McNames et al. |
| 9,600,030 B2 | 3/2017 | Bailey et al. |
| 9,612,661 B2 | 4/2017 | Wagner et al. |
| 9,613,262 B2 | 4/2017 | Holz |
| 9,652,047 B2 | 5/2017 | Mullins et al. |
| 9,654,477 B1 | 5/2017 | Kotamraju |
| 9,659,403 B1 | 5/2017 | Horowitz |
| 9,687,168 B2 | 6/2017 | John |
| 9,696,795 B2 | 7/2017 | Marcolina et al. |
| 9,720,515 B2 | 8/2017 | Wagner et al. |
| 9,741,169 B1 | 8/2017 | Holz |
| 9,766,709 B2 | 9/2017 | Holz |
| 9,785,247 B1 | 10/2017 | Horowitz et al. |
| 9,788,789 B2 | 10/2017 | Bailey |
| 9,807,221 B2 | 10/2017 | Bailey et al. |
| 9,864,431 B2 | 1/2018 | Keskin et al. |
| 9,867,548 B2 | 1/2018 | Le et al. |
| 9,880,632 B2 | 1/2018 | Ataee et al. |
| 9,891,718 B2 | 2/2018 | Connor |
| 9,921,641 B1 | 3/2018 | Worley, III et al. |
| 10,042,422 B2 | 8/2018 | Morun et al. |
| 10,070,799 B2 | 9/2018 | Ang et al. |
| 10,078,435 B2 | 9/2018 | Noel |
| 10,101,809 B2 | 10/2018 | Morun et al. |
| 10,152,082 B2 | 12/2018 | Bailey |
| 10,185,416 B2 | 1/2019 | Mistry et al. |
| 10,188,309 B2 | 1/2019 | Morun et al. |
| 10,199,008 B2 | 2/2019 | Aleem et al. |
| 10,203,751 B2 | 2/2019 | Keskin et al. |
| 10,216,274 B2 | 2/2019 | Chapeskie et al. |
| 10,251,577 B2 | 4/2019 | Morun et al. |
| 10,310,601 B2 | 6/2019 | Morun et al. |
| 10,331,210 B2 | 6/2019 | Morun et al. |
| 10,362,958 B2 | 7/2019 | Morun et al. |
| 10,409,371 B2 | 9/2019 | Kaifosh et al. |
| 10,429,928 B2 | 10/2019 | Morun et al. |
| 10,437,335 B2 | 10/2019 | Daniels |
| 10,460,455 B2 | 10/2019 | Giurgica-Tiron et al. |
| 10,489,986 B2 | 11/2019 | Kaifosh et al. |
| 10,496,168 B2 | 12/2019 | Kaifosh et al. |
| 10,504,286 B2 | 12/2019 | Kaifosh et al. |
| 10,520,378 B1 | 12/2019 | Brown et al. |
| 10,528,135 B2 | 1/2020 | Bailey et al. |
| 10,558,273 B2 | 2/2020 | Park et al. |
| 10,592,001 B2 | 3/2020 | Berenzweig et al. |
| 10,610,737 B1 | 4/2020 | Crawford |
| 10,676,083 B1 | 6/2020 | De Sapio et al. |
| 10,687,759 B2 | 6/2020 | Guo et al. |
| 10,905,350 B2 | 2/2021 | Berenzweig et al. |
| 10,905,383 B2 | 2/2021 | Barachant |
| 10,937,414 B2 | 3/2021 | Berenzweig et al. |
| 10,990,174 B2 | 4/2021 | Kaifosh et al. |
| 11,009,951 B2 | 5/2021 | Bailey et al. |
| 11,150,730 B1 | 10/2021 | Anderson et al. |
| 2001/0033402 A1 | 10/2001 | Popovich |
| 2002/0003627 A1 | 1/2002 | Rieder |
| 2002/0009972 A1 | 1/2002 | Amento et al. |
| 2002/0030636 A1 | 3/2002 | Richards |

(56) References Cited

U.S. PATENT DOCUMENTS

| | | |
|---|---|---|
| 2002/0032386 A1 | 3/2002 | Snackner et al. |
| 2002/0077534 A1 | 6/2002 | DuRousseau |
| 2002/0094701 A1 | 7/2002 | Biegelsen et al. |
| 2002/0120415 A1 | 8/2002 | Millott et al. |
| 2002/0120916 A1 | 8/2002 | Snider, Jr. |
| 2002/0198472 A1 | 12/2002 | Kramer |
| 2003/0030595 A1 | 2/2003 | Radley-Smith |
| 2003/0036691 A1 | 2/2003 | Stanaland et al. |
| 2003/0051505 A1 | 3/2003 | Robertson et al. |
| 2003/0144586 A1 | 7/2003 | Tsubata |
| 2003/0144829 A1 | 7/2003 | Geatz et al. |
| 2003/0171921 A1 | 9/2003 | Manabe et al. |
| 2003/0182630 A1 | 9/2003 | Saund et al. |
| 2003/0184544 A1 | 10/2003 | Prudent |
| 2004/0010210 A1 | 1/2004 | Avinash et al. |
| 2004/0024312 A1 | 2/2004 | Zheng |
| 2004/0054273 A1 | 3/2004 | Finneran et al. |
| 2004/0068409 A1 | 4/2004 | Tanaka et al. |
| 2004/0073104 A1 | 4/2004 | Brun del Re et al. |
| 2004/0080499 A1 | 4/2004 | Lui |
| 2004/0092839 A1 | 5/2004 | Shin et al. |
| 2004/0194500 A1 | 10/2004 | Rapport |
| 2004/0210165 A1 | 10/2004 | Marmaropoulos et al. |
| 2004/0243342 A1* | 12/2004 | Rekimoto ............... G06F 3/015 702/150 |
| 2004/0254617 A1 | 12/2004 | Hemmerling et al. |
| 2005/0005637 A1 | 1/2005 | Rapport |
| 2005/0012715 A1 | 1/2005 | Ford |
| 2005/0070227 A1 | 3/2005 | Shen et al. |
| 2005/0070791 A1 | 3/2005 | Edney et al. |
| 2005/0115561 A1 | 6/2005 | Stahmann et al. |
| 2005/0119701 A1 | 6/2005 | Lauter et al. |
| 2005/0177038 A1 | 8/2005 | Kolpin et al. |
| 2005/0179644 A1 | 8/2005 | Alsio et al. |
| 2006/0018833 A1 | 1/2006 | Murphy et al. |
| 2006/0037359 A1 | 2/2006 | Stinespring |
| 2006/0058699 A1 | 3/2006 | Vitiello et al. |
| 2006/0061544 A1 | 3/2006 | Min et al. |
| 2006/0121958 A1 | 6/2006 | Fung et al. |
| 2006/0129057 A1 | 6/2006 | Maekawa et al. |
| 2006/0132705 A1 | 6/2006 | Li |
| 2006/0149338 A1 | 7/2006 | Flaherty et al. |
| 2006/0211956 A1 | 9/2006 | Sankai |
| 2006/0238707 A1 | 10/2006 | Elvesjo et al. |
| 2007/0009151 A1 | 1/2007 | Pittman et al. |
| 2007/0016265 A1 | 1/2007 | Davoodi et al. |
| 2007/0023662 A1 | 2/2007 | Brady et al. |
| 2007/0078308 A1 | 4/2007 | Daly |
| 2007/0132785 A1 | 6/2007 | Ebersole, Jr. et al. |
| 2007/0148624 A1 | 6/2007 | Nativ |
| 2007/0172797 A1 | 7/2007 | Hada et al. |
| 2007/0177770 A1 | 8/2007 | Derchak et al. |
| 2007/0185697 A1 | 8/2007 | Tan et al. |
| 2007/0256494 A1 | 11/2007 | Nakamura et al. |
| 2007/0276270 A1 | 11/2007 | Tran |
| 2007/0279852 A1 | 12/2007 | Daniel et al. |
| 2007/0285399 A1 | 12/2007 | Lund |
| 2008/0001735 A1 | 1/2008 | Tran |
| 2008/0032638 A1 | 2/2008 | Anderson |
| 2008/0051673 A1 | 2/2008 | Kong et al. |
| 2008/0052643 A1 | 2/2008 | Ike et al. |
| 2008/0058668 A1 | 3/2008 | Seyed Momen et al. |
| 2008/0103639 A1 | 5/2008 | Troy et al. |
| 2008/0103769 A1 | 5/2008 | Schultz et al. |
| 2008/0136775 A1 | 6/2008 | Conant |
| 2008/0152217 A1 | 6/2008 | Greer |
| 2008/0163130 A1 | 7/2008 | Westerman |
| 2008/0214360 A1 | 9/2008 | Stiding et al. |
| 2008/0221487 A1 | 9/2008 | Zahar et al. |
| 2008/0262772 A1 | 10/2008 | Luinge et al. |
| 2008/0278497 A1 | 11/2008 | Jammes et al. |
| 2008/0285805 A1 | 11/2008 | Luinge et al. |
| 2009/0005700 A1 | 1/2009 | Joshi et al. |
| 2009/0007597 A1 | 1/2009 | Hanevold |
| 2009/0027337 A1 | 1/2009 | Hildreth |
| 2009/0031757 A1 | 2/2009 | Harding |
| 2009/0040016 A1 | 2/2009 | Ikeda |
| 2009/0051544 A1 | 2/2009 | Niknejad |
| 2009/0079607 A1 | 3/2009 | Denison et al. |
| 2009/0079813 A1 | 3/2009 | Hildreth |
| 2009/0082692 A1 | 3/2009 | Hale et al. |
| 2009/0082701 A1 | 3/2009 | Zohar et al. |
| 2009/0085864 A1 | 4/2009 | Kutliroff et al. |
| 2009/0102580 A1 | 4/2009 | Uchaykin |
| 2009/0109241 A1 | 4/2009 | Tsujimoto |
| 2009/0112080 A1 | 4/2009 | Matthews |
| 2009/0124881 A1 | 5/2009 | Rytky |
| 2009/0147004 A1 | 6/2009 | Ramon et al. |
| 2009/0179824 A1 | 7/2009 | Tsujimoto et al. |
| 2009/0189864 A1 | 7/2009 | Walker et al. |
| 2009/0189867 A1 | 7/2009 | Krah et al. |
| 2009/0195497 A1 | 8/2009 | Fitzgerald et al. |
| 2009/0204031 A1 | 8/2009 | McNames et al. |
| 2009/0207464 A1 | 8/2009 | Wiltshire et al. |
| 2009/0209878 A1 | 8/2009 | Sanger |
| 2009/0251407 A1 | 10/2009 | Flake et al. |
| 2009/0258669 A1 | 10/2009 | Nie et al. |
| 2009/0265671 A1 | 10/2009 | Sachs et al. |
| 2009/0318785 A1 | 12/2009 | Ishikawa et al. |
| 2009/0319230 A1 | 12/2009 | Case, Jr. et al. |
| 2009/0322653 A1 | 12/2009 | Putilin et al. |
| 2009/0326406 A1 | 12/2009 | Tan et al. |
| 2009/0327171 A1 | 12/2009 | Tan et al. |
| 2010/0030532 A1 | 2/2010 | Arora et al. |
| 2010/0041974 A1 | 2/2010 | Ting et al. |
| 2010/0063794 A1 | 3/2010 | Hernandez-Rebollar |
| 2010/0066664 A1 | 3/2010 | Son et al. |
| 2010/0106044 A1 | 4/2010 | Linderman |
| 2010/0113910 A1 | 5/2010 | Brauers et al. |
| 2010/0142015 A1 | 6/2010 | Kuwahara et al. |
| 2010/0149073 A1 | 6/2010 | Chaum et al. |
| 2010/0150415 A1 | 6/2010 | Atkinson et al. |
| 2010/0228487 A1 | 9/2010 | Luethardt et al. |
| 2010/0234696 A1 | 9/2010 | Li et al. |
| 2010/0240981 A1 | 9/2010 | Barboutis et al. |
| 2010/0249635 A1 | 9/2010 | Van Der Reijden |
| 2010/0280628 A1 | 11/2010 | Sankai |
| 2010/0292595 A1 | 11/2010 | Paul |
| 2010/0292606 A1 | 11/2010 | Prakash et al. |
| 2010/0292617 A1 | 11/2010 | Lei et al. |
| 2010/0293115 A1 | 11/2010 | Seyed Momen |
| 2010/0306713 A1 | 12/2010 | Geisner et al. |
| 2010/0315266 A1 | 12/2010 | Gunawardana et al. |
| 2010/0317958 A1 | 12/2010 | Beck et al. |
| 2011/0007035 A1 | 1/2011 | Shai |
| 2011/0018754 A1 | 1/2011 | Tojima et al. |
| 2011/0025982 A1 | 2/2011 | Takahashi |
| 2011/0054360 A1 | 3/2011 | Son et al. |
| 2011/0065319 A1 | 3/2011 | Oster et al. |
| 2011/0066381 A1 | 3/2011 | Garudadri et al. |
| 2011/0072510 A1 | 3/2011 | Cheswick |
| 2011/0077484 A1 | 3/2011 | Van Slyke et al. |
| 2011/0082838 A1 | 4/2011 | Niemela |
| 2011/0092826 A1 | 4/2011 | Lee et al. |
| 2011/0119216 A1 | 5/2011 | Wigdor |
| 2011/0133934 A1 | 6/2011 | Tan et al. |
| 2011/0134026 A1 | 6/2011 | Kang et al. |
| 2011/0151974 A1 | 6/2011 | Deaguero |
| 2011/0166434 A1 | 7/2011 | Gargiulo |
| 2011/0172503 A1 | 7/2011 | Knepper et al. |
| 2011/0173204 A1 | 7/2011 | Murillo et al. |
| 2011/0173574 A1 | 7/2011 | Clavin et al. |
| 2011/0181527 A1 | 7/2011 | Capela et al. |
| 2011/0205242 A1 | 8/2011 | Friesen |
| 2011/0213278 A1 | 9/2011 | Horak et al. |
| 2011/0221672 A1 | 9/2011 | Osterhout et al. |
| 2011/0224507 A1 | 9/2011 | Banet et al. |
| 2011/0224556 A1 | 9/2011 | Moon et al. |
| 2011/0224564 A1 | 9/2011 | Moon et al. |
| 2011/0230782 A1 | 9/2011 | Bartol et al. |
| 2011/0248914 A1 | 10/2011 | Sherr |
| 2011/0262002 A1 | 10/2011 | Lee |
| 2011/0270135 A1 | 11/2011 | Dooley et al. |
| 2011/0295100 A1 | 12/2011 | Hegde et al. |

(56) References Cited

U.S. PATENT DOCUMENTS

| | | |
|---|---|---|
| 2011/0313762 A1 | 12/2011 | Ben-David et al. |
| 2012/0002256 A1 | 1/2012 | Lacoste et al. |
| 2012/0007821 A1 | 1/2012 | Zaliva |
| 2012/0029322 A1 | 2/2012 | Wartena et al. |
| 2012/0051005 A1 | 3/2012 | Vanfleteren et al. |
| 2012/0052268 A1 | 3/2012 | Axisa et al. |
| 2012/0053439 A1 | 3/2012 | Ylostalo et al. |
| 2012/0066163 A1 | 3/2012 | Balls et al. |
| 2012/0071092 A1 | 3/2012 | Pasquero et al. |
| 2012/0071780 A1 | 3/2012 | Barachant et al. |
| 2012/0101357 A1 | 4/2012 | Hoskuldsson et al. |
| 2012/0117514 A1 | 5/2012 | Kim et al. |
| 2012/0139817 A1 | 6/2012 | Freeman |
| 2012/0157789 A1 | 6/2012 | Kangas et al. |
| 2012/0157886 A1 | 6/2012 | Tenn et al. |
| 2012/0165695 A1 | 6/2012 | Kidmose et al. |
| 2012/0182309 A1 | 7/2012 | Griffin et al. |
| 2012/0184838 A1 | 7/2012 | John |
| 2012/0188158 A1 | 7/2012 | Tan et al. |
| 2012/0203076 A1 | 8/2012 | Fatta et al. |
| 2012/0209134 A1 | 8/2012 | Morita et al. |
| 2012/0226130 A1 | 9/2012 | De Graff et al. |
| 2012/0249797 A1 | 10/2012 | Haddick et al. |
| 2012/0265090 A1 | 10/2012 | Fink et al. |
| 2012/0265480 A1 | 10/2012 | Oshima |
| 2012/0275621 A1 | 11/2012 | Elko |
| 2012/0283526 A1 | 11/2012 | Gommesen et al. |
| 2012/0283896 A1 | 11/2012 | Persaud et al. |
| 2012/0293548 A1 | 11/2012 | Perez et al. |
| 2012/0302858 A1 | 11/2012 | Kidmose et al. |
| 2012/0320532 A1 | 12/2012 | Wang |
| 2012/0323521 A1 | 12/2012 | De Foras et al. |
| 2013/0004033 A1 | 1/2013 | Trugenberger |
| 2013/0005303 A1 | 1/2013 | Song et al. |
| 2013/0016292 A1 | 1/2013 | Miao et al. |
| 2013/0016413 A1 | 1/2013 | Saeedi et al. |
| 2013/0020948 A1 | 1/2013 | Han et al. |
| 2013/0027341 A1 | 1/2013 | Mastandrea |
| 2013/0038707 A1 | 2/2013 | Cunningham et al. |
| 2013/0077820 A1 | 3/2013 | Marais et al. |
| 2013/0080794 A1 | 3/2013 | Hsieh |
| 2013/0106686 A1 | 5/2013 | Bennett |
| 2013/0123656 A1 | 5/2013 | Heck |
| 2013/0123666 A1 | 5/2013 | Giuffrida et al. |
| 2013/0127708 A1 | 5/2013 | Jung et al. |
| 2013/0131538 A1 | 5/2013 | Gaw et al. |
| 2013/0135223 A1* | 5/2013 | Shai ................. G06F 3/014 345/173 |
| 2013/0135722 A1 | 5/2013 | Yokoyama |
| 2013/0141375 A1 | 6/2013 | Ludwig et al. |
| 2013/0144629 A1 | 6/2013 | Johnson et al. |
| 2013/0165813 A1 | 6/2013 | Chang et al. |
| 2013/0191741 A1 | 7/2013 | Dickinson et al. |
| 2013/0198694 A1 | 8/2013 | Rahman et al. |
| 2013/0207889 A1 | 8/2013 | Chang et al. |
| 2013/0215235 A1 | 8/2013 | Russell |
| 2013/0217998 A1 | 8/2013 | Mahfouz et al. |
| 2013/0221996 A1* | 8/2013 | Poupyrev ............... G01R 27/02 324/705 |
| 2013/0222384 A1 | 8/2013 | Futterer |
| 2013/0232095 A1 | 9/2013 | Tan et al. |
| 2013/0259238 A1 | 10/2013 | Xiang et al. |
| 2013/0265229 A1 | 10/2013 | Forutanpour et al. |
| 2013/0265437 A1 | 10/2013 | Thorn et al. |
| 2013/0271292 A1 | 10/2013 | McDermott |
| 2013/0285901 A1 | 10/2013 | Lee et al. |
| 2013/0285913 A1 | 10/2013 | Griffin et al. |
| 2013/0293580 A1 | 11/2013 | Spivack |
| 2013/0310979 A1 | 11/2013 | Herr et al. |
| 2013/0312256 A1 | 11/2013 | Wesselmann et al. |
| 2013/0317382 A1 | 11/2013 | Le |
| 2013/0317648 A1* | 11/2013 | Assad ................. B25J 9/1694 700/258 |
| 2013/0332196 A1 | 12/2013 | Pinsker |
| 2013/0335302 A1 | 12/2013 | Crane et al. |
| 2014/0005743 A1 | 1/2014 | Giuffrida et al. |
| 2014/0020945 A1 | 1/2014 | Hurwitz et al. |
| 2014/0028539 A1 | 1/2014 | Newham et al. |
| 2014/0028546 A1* | 1/2014 | Jeon ................. G06F 3/014 345/156 |
| 2014/0045547 A1 | 2/2014 | Singamsetty et al. |
| 2014/0049417 A1 | 2/2014 | Abdurrahman et al. |
| 2014/0051946 A1 | 2/2014 | Arne et al. |
| 2014/0052150 A1 | 2/2014 | Taylor et al. |
| 2014/0074179 A1 | 3/2014 | Heldman et al. |
| 2014/0121471 A1 | 3/2014 | Walker |
| 2014/0122958 A1 | 3/2014 | Greenebrg et al. |
| 2014/0092009 A1 | 4/2014 | Yen et al. |
| 2014/0094675 A1 | 4/2014 | Luna et al. |
| 2014/0098018 A1 | 4/2014 | Kim et al. |
| 2014/0100432 A1 | 4/2014 | Golda et al. |
| 2014/0107493 A1 | 4/2014 | Yuen et al. |
| 2014/0132512 A1 | 5/2014 | Gomez Sainz-Garcia |
| 2014/0139422 A1 | 5/2014 | Mistry et al. |
| 2014/0142937 A1 | 5/2014 | Powledge et al. |
| 2014/0143064 A1 | 5/2014 | Tran |
| 2014/0147820 A1 | 5/2014 | Snow et al. |
| 2014/0157168 A1 | 6/2014 | Albouyeh et al. |
| 2014/0194062 A1 | 7/2014 | Palin et al. |
| 2014/0196131 A1 | 7/2014 | Lee |
| 2014/0198034 A1 | 7/2014 | Bailey et al. |
| 2014/0198035 A1 | 7/2014 | Bailey et al. |
| 2014/0198944 A1* | 7/2014 | Forutanpour ............ G06F 3/011 382/103 |
| 2014/0200432 A1 | 7/2014 | Banerji et al. |
| 2014/0201666 A1 | 7/2014 | Bedikian et al. |
| 2014/0202643 A1 | 7/2014 | Hikmet et al. |
| 2014/0204455 A1 | 7/2014 | Popovich et al. |
| 2014/0223462 A1 | 8/2014 | Aimone et al. |
| 2014/0226193 A1 | 8/2014 | Sun |
| 2014/0232651 A1 | 8/2014 | Kress et al. |
| 2014/0236031 A1 | 8/2014 | Banet et al. |
| 2014/0240103 A1 | 8/2014 | Lake et al. |
| 2014/0240223 A1 | 8/2014 | Lake et al. |
| 2014/0245200 A1 | 8/2014 | Holz |
| 2014/0249397 A1 | 9/2014 | Lake et al. |
| 2014/0257141 A1 | 9/2014 | Giuffrida et al. |
| 2014/0258864 A1 | 9/2014 | Shenoy et al. |
| 2014/0277622 A1 | 9/2014 | Raniere |
| 2014/0278139 A1 | 9/2014 | Hong et al. |
| 2014/0278441 A1 | 9/2014 | Ton et al. |
| 2014/0279860 A1 | 9/2014 | Pan et al. |
| 2014/0282282 A1 | 9/2014 | Holz |
| 2014/0285326 A1 | 9/2014 | Luna et al. |
| 2014/0285429 A1 | 9/2014 | Simmons |
| 2014/0297528 A1 | 10/2014 | Agrawal et al. |
| 2014/0299362 A1 | 10/2014 | Park et al. |
| 2014/0304665 A1 | 10/2014 | Holz |
| 2014/0310595 A1 | 10/2014 | Acharya et al. |
| 2014/0330404 A1 | 11/2014 | Abdelghani et al. |
| 2014/0334083 A1 | 11/2014 | Bailey |
| 2014/0334653 A1 | 11/2014 | Luna et al. |
| 2014/0337861 A1 | 11/2014 | Chang et al. |
| 2014/0340857 A1 | 11/2014 | Hsu et al. |
| 2014/0344731 A1 | 11/2014 | Holz |
| 2014/0349257 A1 | 11/2014 | Connor |
| 2014/0354528 A1 | 12/2014 | Laughlin et al. |
| 2014/0354529 A1 | 12/2014 | Laughlin et al. |
| 2014/0355825 A1 | 12/2014 | Kim et al. |
| 2014/0358024 A1 | 12/2014 | Nelson et al. |
| 2014/0358825 A1 | 12/2014 | Phillipps et al. |
| 2014/0359540 A1 | 12/2014 | Kelsey et al. |
| 2014/0361988 A1 | 12/2014 | Katz et al. |
| 2014/0364703 A1 | 12/2014 | Kim et al. |
| 2014/0365163 A1 | 12/2014 | Jallon |
| 2014/0368424 A1 | 12/2014 | Choi et al. |
| 2014/0368428 A1 | 12/2014 | Pinault |
| 2014/0368474 A1 | 12/2014 | Kim et al. |
| 2014/0368896 A1 | 12/2014 | Nakazono et al. |
| 2014/0375465 A1 | 12/2014 | Fenuccio et al. |
| 2014/0376773 A1 | 12/2014 | Holz |
| 2015/0006120 A1 | 1/2015 | Sett et al. |
| 2015/0010203 A1 | 1/2015 | Muninder et al. |
| 2015/0011857 A1 | 1/2015 | Henson et al. |

(56) References Cited

U.S. PATENT DOCUMENTS

| | | |
|---|---|---|
| 2015/0019135 A1 | 1/2015 | Kacyvenski et al. |
| 2015/0025355 A1 | 1/2015 | Bailey et al. |
| 2015/0029092 A1 | 1/2015 | Holz et al. |
| 2015/0035827 A1 | 2/2015 | Yamaokaet et al. |
| 2015/0036221 A1 | 2/2015 | Stephenson |
| 2015/0045689 A1 | 2/2015 | Barone |
| 2015/0045699 A1 | 2/2015 | Mokaya et al. |
| 2015/0051470 A1 | 2/2015 | Bailey et al. |
| 2015/0057506 A1 | 2/2015 | Luna et al. |
| 2015/0057770 A1 | 2/2015 | Bailey et al. |
| 2015/0065840 A1 | 3/2015 | Bailey |
| 2015/0070270 A1 | 3/2015 | Bailey et al. |
| 2015/0070274 A1 | 3/2015 | Morozov |
| 2015/0072326 A1 | 3/2015 | Mauri et al. |
| 2015/0084860 A1 | 3/2015 | Aleem et al. |
| 2015/0091790 A1 | 4/2015 | Forutanpour et al. |
| 2015/0094564 A1 | 4/2015 | Tashman et al. |
| 2015/0099946 A1 | 4/2015 | Sahin |
| 2015/0106052 A1 | 4/2015 | Balakrishnan et al. |
| 2015/0109202 A1 | 4/2015 | Ataee et al. |
| 2015/0124566 A1* | 5/2015 | Lake ............... G04G 21/08 368/10 |
| 2015/0128094 A1 | 5/2015 | Baldwin et al. |
| 2015/0141784 A1 | 5/2015 | Morun et al. |
| 2015/0148641 A1 | 5/2015 | Morun et al. |
| 2015/0148728 A1 | 5/2015 | Sallum et al. |
| 2015/0157944 A1 | 6/2015 | Gottlieb |
| 2015/0160621 A1 | 6/2015 | Yilmaz |
| 2015/0169074 A1 | 6/2015 | Ataee et al. |
| 2015/0170421 A1 | 6/2015 | Mandella et al. |
| 2015/0177841 A1 | 6/2015 | Vanblon et al. |
| 2015/0182113 A1 | 7/2015 | Utter, II |
| 2015/0182130 A1 | 7/2015 | Utter, II |
| 2015/0182160 A1 | 7/2015 | Kim et al. |
| 2015/0182163 A1 | 7/2015 | Utter |
| 2015/0182164 A1 | 7/2015 | Utter, II |
| 2015/0182165 A1 | 7/2015 | Miller et al. |
| 2015/0185838 A1 | 7/2015 | Camacho-Perez et al. |
| 2015/0186609 A1 | 7/2015 | Utter, II |
| 2015/0187355 A1 | 7/2015 | Parkinson et al. |
| 2015/0193949 A1 | 7/2015 | Katz et al. |
| 2015/0199025 A1 | 7/2015 | Holz |
| 2015/0205126 A1 | 7/2015 | Schowengerdt |
| 2015/0205134 A1 | 7/2015 | Bailey et al. |
| 2015/0213191 A1 | 7/2015 | Abdelghani et al. |
| 2015/0216475 A1 | 8/2015 | Luna et al. |
| 2015/0220152 A1 | 8/2015 | Tait et al. |
| 2015/0223716 A1 | 8/2015 | Korkala et al. |
| 2015/0230756 A1 | 8/2015 | Luna et al. |
| 2015/0234426 A1 | 8/2015 | Bailey et al. |
| 2015/0237716 A1 | 8/2015 | Su et al. |
| 2015/0242009 A1 | 8/2015 | Xiao et al. |
| 2015/0242120 A1 | 8/2015 | Rodriguez |
| 2015/0242575 A1 | 8/2015 | Abovitz et al. |
| 2015/0261306 A1 | 9/2015 | Lake |
| 2015/0261318 A1 | 9/2015 | Scavezze et al. |
| 2015/0272483 A1 | 10/2015 | Etemad et al. |
| 2015/0277575 A1 | 10/2015 | Ataee et al. |
| 2015/0288944 A1 | 10/2015 | Nistico et al. |
| 2015/0289995 A1 | 10/2015 | Wilkinson et al. |
| 2015/0296553 A1 | 10/2015 | DiFranco et al. |
| 2015/0302168 A1 | 10/2015 | De Sapio et al. |
| 2015/0305672 A1 | 10/2015 | Grey et al. |
| 2015/0309563 A1 | 10/2015 | Connor |
| 2015/0309582 A1 | 10/2015 | Gupta |
| 2015/0310766 A1 | 10/2015 | Alshehri et al. |
| 2015/0312175 A1 | 10/2015 | Langholz |
| 2015/0313496 A1 | 11/2015 | Connor |
| 2015/0323998 A1 | 11/2015 | Kudekar et al. |
| 2015/0325202 A1 | 11/2015 | Lake et al. |
| 2015/0332013 A1 | 11/2015 | Lee et al. |
| 2015/0346701 A1 | 12/2015 | Gordon et al. |
| 2015/0351690 A1 | 12/2015 | Toth et al. |
| 2015/0355716 A1 | 12/2015 | Balasubramanian et al. |
| 2015/0355718 A1 | 12/2015 | Slonneger |
| 2015/0362734 A1 | 12/2015 | Moser et al. |
| 2015/0366504 A1 | 12/2015 | Connor |
| 2015/0370326 A1 | 12/2015 | Chapeskie et al. |
| 2015/0370333 A1 | 12/2015 | Ataee et al. |
| 2015/0378161 A1 | 12/2015 | Bailey et al. |
| 2015/0378162 A1 | 12/2015 | Bailey et al. |
| 2015/0378164 A1 | 12/2015 | Bailey et al. |
| 2015/0379770 A1 | 12/2015 | Haley, Jr. et al. |
| 2016/0011668 A1 | 1/2016 | Gilad-Bachrach et al. |
| 2016/0020500 A1 | 1/2016 | Matsuda |
| 2016/0026853 A1 | 1/2016 | Wexler et al. |
| 2016/0033771 A1 | 2/2016 | Tremblay et al. |
| 2016/0049073 A1 | 2/2016 | Lee |
| 2016/0050037 A1 | 2/2016 | Webb |
| 2016/0071319 A1 | 3/2016 | Fallon et al. |
| 2016/0092504 A1 | 3/2016 | Mitri et al. |
| 2016/0099010 A1 | 4/2016 | Sainath et al. |
| 2016/0107309 A1 | 4/2016 | Walsh et al. |
| 2016/0113587 A1 | 4/2016 | Kothe et al. |
| 2016/0144172 A1 | 5/2016 | Hsueh et al. |
| 2016/0150636 A1 | 5/2016 | Otsubo |
| 2016/0156762 A1 | 6/2016 | Bailey et al. |
| 2016/0162604 A1 | 6/2016 | Xioli et al. |
| 2016/0170710 A1 | 6/2016 | Kim et al. |
| 2016/0187992 A1 | 6/2016 | Yamamoto et al. |
| 2016/0195928 A1 | 7/2016 | Wagner et al. |
| 2016/0199699 A1 | 7/2016 | Klassen |
| 2016/0202081 A1 | 7/2016 | Debieuvre et al. |
| 2016/0206206 A1 | 7/2016 | Avila et al. |
| 2016/0207201 A1 | 7/2016 | Herr et al. |
| 2016/0217614 A1 | 7/2016 | Kraver et al. |
| 2016/0235323 A1 | 8/2016 | Tadi et al. |
| 2016/0238845 A1 | 8/2016 | Alexander et al. |
| 2016/0239080 A1 | 8/2016 | Marcolina et al. |
| 2016/0242646 A1 | 8/2016 | Obma |
| 2016/0259407 A1 | 9/2016 | Schick |
| 2016/0262687 A1 | 9/2016 | Imperial |
| 2016/0263458 A1 | 9/2016 | Mather et al. |
| 2016/0274365 A1 | 9/2016 | Bailey et al. |
| 2016/0274732 A1 | 9/2016 | Bang et al. |
| 2016/0274758 A1 | 9/2016 | Bailey |
| 2016/0275726 A1 | 9/2016 | Mullins |
| 2016/0282947 A1 | 9/2016 | Schwarz et al. |
| 2016/0291768 A1 | 10/2016 | Cho et al. |
| 2016/0292497 A1 | 10/2016 | Kehtarnavaz et al. |
| 2016/0309249 A1 | 10/2016 | Wu et al. |
| 2016/0313798 A1 | 10/2016 | Connor |
| 2016/0313801 A1 | 10/2016 | Wagner et al. |
| 2016/0313890 A1 | 10/2016 | Walline et al. |
| 2016/0313899 A1 | 10/2016 | Noel |
| 2016/0314623 A1 | 10/2016 | Coleman et al. |
| 2016/0327796 A1 | 11/2016 | Bailey et al. |
| 2016/0327797 A1 | 11/2016 | Bailey et al. |
| 2016/0342227 A1 | 11/2016 | Natzke et al. |
| 2016/0349514 A1 | 12/2016 | Alexander et al. |
| 2016/0349515 A1 | 12/2016 | Alexander et al. |
| 2016/0349516 A1 | 12/2016 | Alexander et al. |
| 2016/0350973 A1 | 12/2016 | Shapira et al. |
| 2016/0377865 A1 | 12/2016 | Alexander et al. |
| 2016/0377866 A1 | 12/2016 | Alexander et al. |
| 2017/0025026 A1 | 1/2017 | Ortiz Catalan |
| 2017/0031502 A1 | 2/2017 | Rosenberg et al. |
| 2017/0035313 A1 | 2/2017 | Hong et al. |
| 2017/0061817 A1 | 3/2017 | Mettler May |
| 2017/0068095 A1 | 3/2017 | Holland et al. |
| 2017/0068445 A1 | 3/2017 | Lee et al. |
| 2017/0075426 A1 | 3/2017 | Camacho Perez et al. |
| 2017/0080346 A1 | 3/2017 | Abbas |
| 2017/0090604 A1 | 3/2017 | Barbier |
| 2017/0091567 A1 | 3/2017 | Wang et al. |
| 2017/0095178 A1 | 4/2017 | Schoen et al. |
| 2017/0097753 A1 | 4/2017 | Bailey et al. |
| 2017/0115483 A1 | 4/2017 | Aleem et al. |
| 2017/0119472 A1 | 5/2017 | Herrmann et al. |
| 2017/0123487 A1 | 5/2017 | Hazra et al. |
| 2017/0124474 A1 | 5/2017 | Kashyap |
| 2017/0124816 A1 | 5/2017 | Yang et al. |
| 2017/0127354 A1 | 5/2017 | Garland et al. |
| 2017/0147077 A1 | 5/2017 | Park et al. |

(56) References Cited

U.S. PATENT DOCUMENTS

| | | |
|---|---|---|
| 2017/0153701 A1 | 6/2017 | Mahon et al. |
| 2017/0161635 A1 | 6/2017 | Oono et al. |
| 2017/0188878 A1 | 7/2017 | Lee |
| 2017/0188980 A1 | 7/2017 | Ash |
| 2017/0197142 A1 | 7/2017 | Stafford et al. |
| 2017/0205876 A1 | 7/2017 | Vidal et al. |
| 2017/0209055 A1 | 7/2017 | Pantelopoulos et al. |
| 2017/0212290 A1 | 7/2017 | Alexander et al. |
| 2017/0212349 A1 | 7/2017 | Bailey et al. |
| 2017/0219829 A1 | 8/2017 | Bailey |
| 2017/0220923 A1 | 8/2017 | Bae et al. |
| 2017/0237789 A1 | 8/2017 | Harner et al. |
| 2017/0259167 A1 | 9/2017 | Cook et al. |
| 2017/0262064 A1 | 9/2017 | Ofir et al. |
| 2017/0277282 A1 | 9/2017 | Go |
| 2017/0285744 A1 | 10/2017 | Juliato |
| 2017/0285756 A1 | 10/2017 | Wang et al. |
| 2017/0285757 A1 | 10/2017 | Robertson et al. |
| 2017/0285848 A1 | 10/2017 | Rosenberg et al. |
| 2017/0296363 A1 | 10/2017 | Yetkin et al. |
| 2017/0299956 A1 | 10/2017 | Holland et al. |
| 2017/0301630 A1 | 10/2017 | Nguyen et al. |
| 2017/0308118 A1 | 10/2017 | Ito |
| 2017/0312614 A1 | 11/2017 | Tran et al. |
| 2017/0329392 A1 | 11/2017 | Keskin et al. |
| 2017/0329404 A1 | 11/2017 | Keskin et al. |
| 2017/0340506 A1 | 11/2017 | Zhang et al. |
| 2017/0344706 A1 | 11/2017 | Torres et al. |
| 2017/0347908 A1 | 12/2017 | Watanabe et al. |
| 2017/0371403 A1 | 12/2017 | Wetzler et al. |
| 2018/0000367 A1 | 1/2018 | Longinotti-Buitoni |
| 2018/0018825 A1 | 1/2018 | Kim et al. |
| 2018/0020285 A1 | 1/2018 | Zass |
| 2018/0020951 A1 | 1/2018 | Kaifosh et al. |
| 2018/0020978 A1 | 1/2018 | Kaifosh et al. |
| 2018/0020990 A1 | 1/2018 | Park et al. |
| 2018/0024634 A1 | 1/2018 | Kaifosh et al. |
| 2018/0024635 A1 | 1/2018 | Kaifosh et al. |
| 2018/0024641 A1 | 1/2018 | Mao et al. |
| 2018/0064363 A1 | 3/2018 | Morun et al. |
| 2018/0067553 A1 | 3/2018 | Morun et al. |
| 2018/0068489 A1 | 3/2018 | Kim et al. |
| 2018/0074332 A1 | 3/2018 | Li et al. |
| 2018/0081439 A1 | 3/2018 | Daniels |
| 2018/0088675 A1 | 3/2018 | Vogel et al. |
| 2018/0088765 A1 | 3/2018 | Bailey |
| 2018/0092599 A1 | 4/2018 | Kerth et al. |
| 2018/0093181 A1 | 4/2018 | Goslin et al. |
| 2018/0095542 A1 | 4/2018 | Mallinson |
| 2018/0095630 A1 | 4/2018 | Bailey |
| 2018/0101235 A1 | 4/2018 | Bodensteiner et al. |
| 2018/0101289 A1 | 4/2018 | Bailey |
| 2018/0107275 A1 | 4/2018 | Chen et al. |
| 2018/0120948 A1 | 5/2018 | Aleem et al. |
| 2018/0133551 A1 | 5/2018 | Chang et al. |
| 2018/0140441 A1 | 5/2018 | Poirters |
| 2018/0153430 A1 | 6/2018 | Ang et al. |
| 2018/0153444 A1 | 6/2018 | Yang et al. |
| 2018/0154140 A1 | 6/2018 | Bouton et al. |
| 2018/0168905 A1 | 6/2018 | Goodall et al. |
| 2018/0178008 A1 | 6/2018 | Bouton et al. |
| 2018/0217249 A1 | 8/2018 | La Salla et al. |
| 2018/0239430 A1 | 8/2018 | Tadi et al. |
| 2018/0240459 A1 | 8/2018 | Weng et al. |
| 2018/0247443 A1 | 8/2018 | Briggs et al. |
| 2018/0279919 A1 | 10/2018 | Bansbach et al. |
| 2018/0301057 A1 | 10/2018 | Hargrove et al. |
| 2018/0307314 A1 | 10/2018 | Connor |
| 2018/0314879 A1 | 11/2018 | Khwaja et al. |
| 2018/0321745 A1 | 11/2018 | Morun et al. |
| 2018/0321746 A1 | 11/2018 | Morun et al. |
| 2018/0330549 A1 | 11/2018 | Brenton |
| 2018/0333575 A1 | 11/2018 | Bouton |
| 2018/0344195 A1 | 12/2018 | Morun et al. |
| 2018/0356890 A1 | 12/2018 | Zhang et al. |
| 2018/0360379 A1 | 12/2018 | Harrison et al. |
| 2019/0008453 A1 | 1/2019 | Spoof |
| 2019/0025919 A1 | 1/2019 | Tadi et al. |
| 2019/0027141 A1 | 1/2019 | Strong et al. |
| 2019/0033967 A1 | 1/2019 | Morun et al. |
| 2019/0033974 A1 | 1/2019 | Mu et al. |
| 2019/0038166 A1 | 2/2019 | Tavabi et al. |
| 2019/0056422 A1 | 2/2019 | Park et al. |
| 2019/0076716 A1 | 3/2019 | Chiou et al. |
| 2019/0113973 A1 | 4/2019 | Coleman et al. |
| 2019/0121305 A1 | 4/2019 | Kaifosh et al. |
| 2019/0121306 A1 | 4/2019 | Kaifosh et al. |
| 2019/0146809 A1 | 5/2019 | Lee et al. |
| 2019/0150777 A1 | 5/2019 | Guo et al. |
| 2019/0192037 A1 | 6/2019 | Morun et al. |
| 2019/0196585 A1 | 6/2019 | Laszlo et al. |
| 2019/0196586 A1 | 6/2019 | Laszlo et al. |
| 2019/0197778 A1 | 6/2019 | Sachdeva et al. |
| 2019/0212817 A1 | 7/2019 | Kaifosh et al. |
| 2019/0223748 A1 | 7/2019 | Al-natsheh et al. |
| 2019/0227627 A1 | 7/2019 | Kaifosh et al. |
| 2019/0228330 A1 | 7/2019 | Kaifosh et al. |
| 2019/0228533 A1 | 7/2019 | Giurgica-Tiron et al. |
| 2019/0228579 A1 | 7/2019 | Kaifosh et al. |
| 2019/0228590 A1 | 7/2019 | Kaifosh et al. |
| 2019/0228591 A1 | 7/2019 | Giurgica-Tiron et al. |
| 2019/0247650 A1 | 8/2019 | Tran |
| 2019/0279407 A1 | 9/2019 | McHugh et al. |
| 2019/0294243 A1 | 9/2019 | Laszlo et al. |
| 2019/0324549 A1 | 10/2019 | Araki et al. |
| 2019/0348026 A1 | 11/2019 | Berenzweig et al. |
| 2019/0348027 A1 | 11/2019 | Berenzweig et al. |
| 2019/0357787 A1 | 11/2019 | Barachant et al. |
| 2019/0362557 A1 | 11/2019 | Lacey et al. |
| 2020/0042089 A1 | 2/2020 | Ang et al. |
| 2020/0057661 A1 | 2/2020 | Bendfeldt |
| 2020/0065569 A1 | 2/2020 | Nduka et al. |
| 2020/0069210 A1 | 3/2020 | Berenzweig et al. |
| 2020/0069211 A1 | 3/2020 | Berenzweig et al. |
| 2020/0073483 A1 | 3/2020 | Berenzweig et al. |
| 2020/0097081 A1 | 3/2020 | Stone et al. |
| 2020/0097083 A1 | 3/2020 | Mao et al. |
| 2020/0111260 A1 | 4/2020 | Osborn et al. |
| 2020/0125171 A1 | 4/2020 | Morun et al. |
| 2020/0142490 A1 | 5/2020 | Xiong et al. |
| 2020/0159322 A1 | 5/2020 | Morun et al. |
| 2020/0163562 A1 | 5/2020 | Neaves |
| 2020/0225320 A1 | 7/2020 | Belskikh et al. |
| 2020/0245873 A1 | 8/2020 | Frank et al. |
| 2020/0249752 A1 | 8/2020 | Parshionikar |
| 2020/0275895 A1 | 9/2020 | Barachant |
| 2020/0301509 A1 | 9/2020 | Liu et al. |
| 2020/0320335 A1 | 10/2020 | Shamun et al. |
| 2021/0109598 A1 | 4/2021 | Zhang et al. |
| 2021/0117523 A1 | 4/2021 | Kim et al. |
| 2021/0290159 A1 | 9/2021 | Bruinsma et al. |

FOREIGN PATENT DOCUMENTS

| | | |
|---|---|---|
| CN | 111902077 A | 11/2020 |
| CN | 112074225 A | 12/2020 |
| CN | 112469469 A | 3/2021 |
| CN | 112822992 A | 5/2021 |
| DE | 44 12 278 A1 | 10/1995 |
| EP | 0 301 790 A2 | 2/1989 |
| EP | 1 345 210 A2 | 9/2003 |
| EP | 1408443 B1 | 10/2006 |
| EP | 2 541 763 A1 | 1/2013 |
| EP | 2733578 A2 | 5/2014 |
| EP | 3200051 A1 | 8/2017 |
| EP | 3 487 395 A1 | 5/2019 |
| JP | S61198892 A | 9/1986 |
| JP | H07248873 A | 9/1995 |
| JP | 3103427 B2 | 10/2000 |
| JP | 2002287869 A | 10/2002 |
| JP | 2003303047 A | 10/2003 |
| JP | 2005352739 A | 12/2005 |
| JP | 2008192004 A | 8/2008 |
| JP | 2009-50679 A | 3/2009 |

(56) References Cited

FOREIGN PATENT DOCUMENTS

| | | | |
|---|---|---|---|
| JP | 2013160905 A | 8/2013 | |
| JP | 2019023941 A | 2/2019 | |
| JP | 2021072136 A | 5/2021 | |
| KR | 20110040165 A | 4/2011 | |
| KR | 10-2012-0094870 A | 8/2012 | |
| KR | 10-2012-0097997 A | 9/2012 | |
| KR | 20170067873 A | 6/2017 | |
| KR | 10-2017-0107283 A | 9/2017 | |
| WO | 9527341 A1 | 10/1995 | |
| WO | 2006086504 A2 | 8/2006 | |
| WO | WO-2011011750 A1 | 1/2011 | |
| WO | 2011/070554 A2 | 6/2011 | |
| WO | WO-2014155288 A2 | 10/2014 | |
| WO | WO-2015063520 A1 | 5/2015 | |
| WO | 2015/00172 A1 | 7/2015 | |
| WO | WO-2015123775 A1 | 8/2015 | |
| WO | 2015184760 A1 | 12/2015 | |
| WO | 2015192117 A1 | 12/2015 | |
| WO | 2017075611 A1 | 5/2017 | |
| WO | 2018/022602 A1 | 2/2018 | |
| WO | 2018098046 A2 | 5/2018 | |
| WO | 2019/099758 A1 | 5/2019 | |
| WO | 2019147953 A1 | 8/2019 | |
| WO | 2019147958 A1 | 8/2019 | |
| WO | 2019147996 A1 | 8/2019 | |
| WO | 2019/217419 A2 | 11/2019 | |
| WO | 2019226259 A1 | 11/2019 | |
| WO | 2019231911 A1 | 12/2019 | |
| WO | 2020/047429 A1 | 3/2020 | |
| WO | 2020/061440 A1 | 3/2020 | |
| WO | 2020061451 A1 | 3/2020 | |
| WO | 2020072915 A1 | 4/2020 | |

OTHER PUBLICATIONS

Extended European Search Report received for EP Patent Application Serial No. 17835112.8 dated Feb. 5, 2020, 17 pages.
Final Office Action received for U.S. Appl. No. 16/353,998 dated Nov. 29, 2019, 33 pages.
Non-Final Office Action received for U.S. Appl. No. 16/557,342 dated Oct. 22, 2019, 16 pages.
International Preliminary Report on Patentability received for PCT Application Serial No. PCT/US2014/017799 dated Sep. 3, 2015, 8 pages.
International Preliminary Report on Patentability received for PCT Application Serial No. PCT/US2014/037863 dated Nov. 26, 2015, 8 pages.
International Preliminary Report on Patentability received for PCT Application Serial No. PCT/US2014/052143 dated Mar. 3, 2016, 7 pages.
International Preliminary Report on Patentability received for PCT Application Serial No. PCT/US2014/067443 dated Jun. 9, 2016, 7 pages.
International Preliminary Report on Patentability received for PCT Application Serial No. PCT/US2015/015675 dated Aug. 25, 2016, 8 pages.
International Search Report and Written Opinion received for PCT Application Serial No. PCT/US2019/049094 dated Jan. 9, 2020, 27 pages.
Corazza et al., "A Markerless Motion Capture System to Study Musculoskeletal Biomechanics: Visual Hull and Simulated Annealing Approach", Annals of Biomedical Engineering, vol. 34, No. 6, Jul. 2006, pp. 1019-1029.
Non-Final Office Action received for U.S. Appl. No. 15/659,072 dated Apr. 30, 2019, 99 pages.
Final Office Action received for U.S. Appl. No. 15/659,072 dated Nov. 29, 2019, 36 pages.
Non-Final Office Action received for U.S. Appl. No. 16/353,998 dated May 24, 2019, 20 pages.
Final Office Action received for U.S. Appl. No. 16/557,342 dated Jan. 28, 2020, 15 pages.
Non-Final Office Action received for U.S. Appl. No. 16/557,383 dated Dec. 23, 2019, 53 pages.
Non-Final Office Action received for U.S. Appl. No. 16/557,427 dated Dec. 23, 2019, 52 pages.
Non-Final Office Action received for U.S. Appl. No. 15/816,435 dated Jan. 22, 2020, 35 pages.
Non-Final Office Action received for U.S. Appl. No. 16/577,207 dated Nov. 19, 2019, 32 pages.
Final Office Action received for U.S. Appl. No. 16/577,207 dated Feb. 4, 2020, 76 pages.
Berenzweig et al., "Wearable Devices and Methods for Improved Speech Recognition", U.S. Appl. No. 16/785,680, filed Feb. 10, 2020, 67 pages.
Non-Final Office Action received for U.S. Appl. No. 15/974,454 dated Dec. 20, 2019, 41 pages.
Final Office Action received for U.S. Appl. No. 15/974,454 dated Apr. 9, 2020, 19 pages.
International Search Report and Written Opinion received for PCT Application Serial No. PCT/US2019/031114 dated Dec. 20, 2019, 18 pages.
Costanza et al., "EMG as a Subtle Input Interface for Mobile Computing", Mobile HCI 2004, LNCS 3160, edited by S. Brewster and M. Dunlop, Springer-Verlag Berlin Heidelberg, pp. 426-430, 2004.
Costanza et al., "Toward Subtle Intimate Interfaces for Mobile Devices Using an EMG Controller", CHI 2005, Proceedings of the SIGCHI Conference on Human Factors in Computing Systems, pp. 481-489, 2005.
Ghasemzadeh et al., "A Body Sensor Network With Electromyogram and Inertial Sensors: Multimodal Interpretation of Muscular Activities", IEEE Transactions on Information Technology in Biomedicine, vol. 14, No. 2, pp. 198-206, Mar. 2010.
Gourmelon et al., "Contactless sensors for Surface Electromyography", Proceedings of the 28th IEEE EMBS Annual International Conference, New York City, NY, Aug. 30-Sep. 3, 2006, pp. 2514-2517.
International Search Report and Written Opinion, dated May 16, 2014, for corresponding International Application No. PCT/US2014/017799, 9 pages.
International Search Report and Written Opinion, dated Aug. 21, 2014, for corresponding International Application No. PCT/US2014/037863, 10 pages.
International Search Report and Written Opinion, dated Nov. 21, 2014, for corresponding International Application No. PCT/US2014/052143, 9 pages.
International Search Report and Written Opinion, dated Feb. 27, 2015, for corresponding International Application No. PCT/US2014/067443, 10 pages.
International Search Report and Written Opinion, dated May 27, 2015, for corresponding International Application No. PCT/US2015/015675, 9 pages.
Morris et al., "Emerging Input Technologies for Always-Available Mobile Interaction", Foundations and Trends in Human-Computer Interaction 4(4)245-316, 2010. (74 total pages).
Naik et al., "Real-Time Hand Gesture Identification for Human Computer Interaction Based on ICA of Surface Electromyogram", !IADIS International Conference Interfaces and Human Computer Interaction, 2007, 8 pages.
Picard et al., "Affective Wearables", Proceedings of the IEEE 1st International Symposium on Wearable Computers, ISWC, Cambridge, MA, USA, Oct. 13-14, 1997, pp. 90-97.
Rekimoto, "Gesture Wrist and GesturePad: Unobtrusive Wearable Interaction Devices", ISWC '01 Proceedings of the 5th IEEE International Symposium on Wearable Computers, 2001, 7 pages.
Saponas et al., "Making Muscle-Computer Interfaces More Practical", CHI 2010, Atlanta, Georgia, USA, Apr. 10-15, 2010, 4 pages.
Sato et al., "Touche: Enhancing Touch Interaction on Humans, Screens, Liquids, and Everyday Objects", CHI' 12, May 5-10, 2012, Austin, Texas.
Ueno et al., "A Capacitive Sensor System for Measuring Laplacian Electromyogram through Cloth: A Pilot Study", Jroceedings of the 29th Annual International Conference of the IEEE EMBS, Cite Internationale, Lyon, France, Aug. 23-26, 2007.

(56) References Cited

OTHER PUBLICATIONS

Ueno et al., "Feasibility of Capacitive Sensing of Surface Electromyographic Potential through Cloth", Sensors and Materials 24(6):335-346, 2012.
Xiong et al., "A Novel HCI based on EMG and IMU", Proceedings of the 2011 IEEE International Conference on Robotics and Biomimetics, Phuket, Thailand, Dec. 7-11, 2011, 5 pages.
Zhang et al., "A Framework for Hand Gesture Recognition Based on Accelerometer and EMG Sensors", IEEE Transactions on Systems, Man, and Cybernetics—Part A: Systems and Humans, vol. 41, No. 6, pp. 1064-1076, Nov. 2011.
Non-Final Office Action received for U.S. Appl. No. 14/505,836 dated Jun. 30, 2016, 37 pages.
Xu et al., "Hand Gesture Recognition and Virtual Game Control Based on 3D Accelerometer and EMG Sensors", Proceedings of the 14th international conference on Intelligent user interfaces, Sanibel Island, Florida, Feb. 8-11, 2009, pp. 401-406.
Communication pursuant to Rule 164(1) EPC, dated Sep. 30, 2016, for corresponding EP Application No. 14753949.8, 7 pages.
Non-Final Office Action received for U.S. Appl. No. 14/505,836 dated Feb. 23, 2017, 54 pages.
Brownlee, "Finite State Machines (FSM): Finite state machines as a control technique in Artificial Intelligence (AI)", Jun. 2002, 12 pages.
Final Office Action received for U.S. Appl. No. 14/505,836 dated Jul. 28, 2017, 52 pages.
Non-Final Office Action received for U.S. Appl. No. 15/659,072 dated Jun. 5, 2020, 59 pages.
Non-Final Office Action received for U.S. Appl. No. 16/353,998 dated May 26, 2020, 60 pages.
Non-Final Office Action received for U.S. Appl. No. 15/974,430 dated Apr. 30, 2020, 57 pages.
Final Office Action received for U.S. Appl. No. 16/557,383 dated Jun. 2, 2020, 66 pages.
Final Office Action received for U.S. Appl. No. 16/557,427 dated Jun. 5, 2020, 95 pages.
Preinterview First Office Action received for U.S. Appl. No. 16/785,680 dated Jun. 24, 2020, 90 pages.
Non-Final Office Action received for U.S. Appl. No. 16/557,342 dated Jun. 15, 2020, 46 pages.
Non-Final Office Action received for U.S. Appl. No. 15/974,454 dated Aug. 20, 2020, 59 pages.
Notice of Allowance received for U.S. Appl. No. 16/557,427 dated Aug. 19, 2020, 22 pages.
Non-Final Office Action received for U.S. Appl. No. 15/974,430 dated Mar. 2, 2021, 32 pages.
Non-Final Office Action received for U.S. Appl. No. 16/557,342 dated Feb. 8, 2021, 11 pages.
Extended European Search Report received for EP Patent Application Serial No. 19799947.7 dated May 26, 2021, 11 pages.
Cannan et al., "A wearable sensor fusion armband for simple motion control and selection for disabled and non-disabled users", 4th Computer Science and Electronic Engineering Conference, IEEE, Sep. 12, 2012, pp. 216-219.
Non-Final Office Action received for U.S. Appl. No. 15/816,435 dated Jun. 3, 2021, 32 pages.
Notice of Allowance received for U.S. Appl. No. 15/659,072 dated Dec. 23, 2020, 26 pages.
Final Office Action received for U.S. Appl. No. 15/974,430 dated Nov. 3, 2020, 27 pages.
Notice of Allowance received for U.S. Appl. No. 15/974,454 dated Nov. 2, 2020, 24 pages.
Final Office Action received for U.S. Appl. No. 16/557,342 dated Oct. 8, 2020, 27 pages.
Final Office Action received for U.S. Appl. No. 15/816,435 dated Sep. 23, 2020, 70 pages.
Non-Final Office Action received for U.S. Appl. No. 16/577,207 dated Oct. 8, 2020, 51 pages.
Final Office Action received for U.S. Appl. No. 16/577,207 dated Jan. 13, 2021, 91 pages.
Partial Supplementary Search Report received for EP Patent Application Serial No. 18879156.0 dated Dec. 7, 2020, 10 pages.
Communication Pursuant to Article 94(3) EPC received for EP Patent Application Serial No. 17835112.8 dated Dec. 14, 2020, 6 pages.
Non-Final Office Action dated May 16, 2019 for U.S. Appl. No. 15/974,384, filed May 8, 2018, 13 Pages.
Non-Final Office Action dated May 16, 2019 for U.S. Appl. No. 15/974,430, filed May 8, 2018, 12 Pages.
Notice of Allowance dated Nov. 4, 2019 for U.S. Appl. No. 15/974,384, filed May 8, 2018, 39 Pages.
Valero-Cuevas F.J., et al., "Computational Models for Neuromuscular Function," IEEE Reviews in Biomedical Engineering, 2009, vol. 2, NIH Public Access Author Manuscript [online], Jun. 16, 2011 [Retrieved on Jul. 29, 2019], 52 pages. Retrieved from the Internet: URL: https://www.ncbi.nlm.nih.gov/pmc/articles/PMC3116649/.
Wittevrongel B., et al., "Spatiotemporal Beamforming: A Transparent and Unified Decoding Approach to Synchronous Visual Brain-Computer Interfacing," Frontiers in Neuroscience, Nov. 15, 2017, vol. 11, Article No. 330, 13 Pages.
Co-Pending U.S. Appl. No. 15/659,072, inventors Patrick; Kaifosh et al., filed Jul. 25, 2017.
Co-Pending U.S. Appl. No. 15/816,435, inventors Ning; Guo et al., filed Nov. 17, 2017.
Co-Pending U.S. Appl. No. 15/974,430, inventors Adam; Berenzweig et al., filed May 8, 2018.
Co-Pending U.S. Appl. No. 16/353,998, inventors Patrick; Kaifosh et al., filed Mar. 14, 2019.
Co-Pending U.S. Appl. No. 16/557,342, inventors Adam; Berenzweig et al., filed Aug. 30, 2019.
Co-Pending U.S. Appl. No. 16/557,383, inventors Adam; Berenzweig et al., filed Aug. 30, 2019.
Co-Pending U.S. Appl. No. 16/557,427, inventors Adam; Berenzweig et al., filed Aug. 30, 2019.
Co-Pending U.S. Appl. No. 16/577,207, filed Sep. 20, 2019, 67 Pages.
Co-Pending U.S. Appl. No. 14/505,836, filed Oct. 3, 2014, 59 Pages.
Co-Pending U.S. Appl. No. 15/974,384, filed May 8, 2018, 44 Pages.
Co-Pending U.S. Appl. No. 15/974,454, filed May 8, 2018, 45 Pages.
Extended European Search Report for European Application No. 18879156.0, dated Mar. 12, 2021, 11 pages.
International Preliminary Report on Patentability for International Application No. PCT/US2017/043791, dated Feb. 7, 2019, 9 Pages.
International Preliminary Report on Patentability for International Application No. PCT/US2019/031114, dated Nov. 19, 2020, 16 pages.
International Preliminary Report on Patentability for International Application No. PCT/US2019/049094, dated Mar. 11, 2021, 24 Pages.
International Preliminary Report on Patentability for International Application No. PCT/US2018/061409, dated May 28, 2020, 10 pages.
International Preliminary Report on Patentability for International Application No. PCT/US2019/052131, dated Apr. 1, 2021, 8 pages.
International Search Report and Written Opinion for International Application No. PCT/US2017/043791, dated Oct. 5, 2017, 10 Pages.
European Search Report for European Application No. 19863248.1, dated Oct. 19, 2021, 2 pages.
Extended European Search Report for European Application No. 19855191.3, dated Dec. 6, 2021, 11 pages.
Fong H.C., et al., "PepperGram With Interactive Control," 22nd International Conference Onvirtual System & Multimedia (VSMM), Oct. 17, 2016, 5 pages.
Kainz et al., "Approach to Hand Tracking and Gesture Recognition Based on Depth-Sensing Cameras and EMG Monitoring," ACTA Informatica Pragensia, vol. 3, Jan. 1, 2014, pp. 104-112, Retrieved from the Internet: URL: https://aip.vse.cz/pdfs/aip/2014/01/08.pdf.
Co-Pending U.S. Appl. No. 16/353,998, filed Mar. 14, 2019, 43 pages.

(56) References Cited

OTHER PUBLICATIONS

Final Office Action dated Jun. 28, 2021 for U.S. Appl. No. 16/557,342, filed Aug. 30, 2019, 11 Pages.
Non-Final Office Action dated Aug. 11, 2021 for U.S. Appl. No. 16/577,207, filed Sep. 20, 2019, 35 Pages.
Notice of Allowance dated Aug. 23, 2021 for U.S. Appl. No. 15/974,430, filed May 8, 2018, 12 pages.
Notice of Allowance dated Jul. 19, 2019 for U.S. Appl. No. 16/258,409, filed Jan. 25, 2019, 36 Pages.
Notice of Allowance dated May 20, 2020 for U.S. Appl. No. 16/389,419, filed Apr. 19, 2019, 28 Pages.
Notice of Allowance dated Jul. 31, 2019 for U.S. Appl. No. 16/257,979, filed Jan. 25, 2019, 22 Pages.
Office action for European Application No. 17835112.8, dated Feb. 11, 2022, 11 Pages.
Office Action for European Patent Application No. 19743717.1, dated Apr. 11, 2022, 10 pages.
Al-Jumaily A., et al., "Electromyogram(EMG) Driven System based Virtual Reality for Prosthetic and Rehabilitation Devices," Proceedings of the 11th International Conference on Information Integration Andweb-Based Applications & Services, Jan. 1, 2009, pp. 582-586.
Al-Timemy A.H., et al., "Improving the Performance Against Force Variation of EMG Controlled Multifunctional Upper-Limb Prostheses for Transradial Amputees," IEEE Transactions on Neural Systems and Rehabilitation Engineering, Jun. 2016, vol. 24 (6), 12 Pages.
Cote-Allard U., et al., "Deep Learning for Electromyographic Hand Gesture Signal Classification Using Transfer Learning," IEEE Transactions on Neural Systems and Rehabilitation Engineering, Jan. 26, 2019, vol. 27 (4), 11 Pages.
European Search Report for European Application No. 19861903.3, dated Oct. 12, 2021, 2 pages.
European Search Report for European Application No. 19868789.9, dated May 9, 2022, 9 pages.
European Search Report for European Application No. 19890394.0, dated Apr. 29, 2022, 9 pages.
Extended European Search Report for European Application No. 19743717.1, dated Mar. 3, 2021, 12 pages.
Extended European Search Report for European Application No. 19744404.5, dated Mar. 29, 2021, 11 pages.
Extended European Search Report for European Application No. 18869441.8, dated Nov. 17, 2020, 20 Pages.
Extended European Search Report for European Application No. 19806723.3, dated Jul. 7, 2021, 13 pages.
Extended European Search Report for European Application No. 19810524.9, dated Mar. 17, 2021, 11 pages.
Extended European Search Report for European Application No. 19850130.6, dated Sep. 1, 2021, 14 Pages.
Extended European Search Report for European Application No. 19883839.3, dated Dec. 15, 2021, 7 pages.
Final Office Action dated Dec. 18, 2019 for U.S. Appl. No. 16/258,279, filed Jan. 25, 2019, 45 Pages.
Final Office Action dated Feb. 19, 2021 for U.S. Appl. No. 16/258,279, filed Jan. 25, 2019, 58 Pages.
Gargiulo G., et al., "Giga-Ohm High-lmpedance FET input Amplifiers tor Dry Electrode biosensor Circuits and Systems," Integrated Microsystems: Electronics, Photonics, and Biotechnolgy, Dec. 19, 2017, 41 Pages, Retrieved from the Internet: URL: https://www.researchgate.net/publication/255994293_Giga-Ohm_high_Impedance_FET_Input_amplifiers_for_Dry_Electrode_Biosensor_circuits_and_systems.
International Preliminary Reporton Patentability for International Application No. PCT/US2019/052151, dated Apr. 1, 2021, 9 pages.
International Preliminary Report on Patentability for International Application No. PCT/US2018/056768, dated Apr. 30, 2020, 7 pages.
International Preliminary Report on Patentability for International Application No. PCT/US2019/015174, dated Aug. 6, 2020, 7 pages.
International Preliminary Report on Patentability for International Application No. PCT/US2019/015183, dated Aug. 6, 2020, 7 pages.
International Preliminary Report on Patentability for International Application No. PCT/US2019/015238, dated Aug. 6, 2020, 7 pages.
International Preliminary Report on Patentability for International Application No. PCT/US2019/028299, dated Dec. 10, 2020, 11 pages.
International Preliminary Report on Patentability for International Application No. PCT/US2019/034173, dated Dec. 10, 2020, 9 pages.
International Preliminary Report on Patentability for International Application No. PCT/US2019/046351, dated Feb. 25, 2021, 8 pages.
International Preliminary Report on Patentability for International Application No. PCT/US2019/054716, dated Apr. 15, 2021, 10 pages.
International Preliminary Report on Patentability for International Application No. PCT/US2019/061759, dated May 27, 2021, 12 pages.
International Preliminary Report on Patentability for International Application No. PCT/US2019/063587, dated Jun. 10, 2021, 13 pages.
International Preliminary Report on Patentability for International Application No. PCT/US2020/049274, dated Mar. 17, 2022, 14 pages.
International Preliminary Report on Patentability for International Application No. PCT/US2020/061392, dated Jun. 9, 2022, 11 pages.
International Search Report and Written Opinion for International Application No. PCT/US2019/052151, dated Jan. 15, 2020, 10 pages.
International Search Report and Written Opinion for International Application No. PCT/US2019/054716, dated Dec. 20, 2019, 11 Pages.
International Search Report and Written Opinion for International Application No. PCT/US2019/061759, dated Jan. 29, 2020, 12 pages.
International Search Report and Written Opinion for International Application No. PCT/US2019/063587, dated Mar. 25, 2020, 16 pages.
International Search Report and Written Opinion for International Application No. PCT/US2020/025735, dated Jun. 22, 2020, 10 pages.
International Search Report and Written Opinion for International Application No. PCT/US2020/025772, dated Aug. 3, 2020, 11 pages.
International Search Report and Written Opinion for International Application No. PCT/US2020/025797, dated Jul. 9, 2020, 10 pages.
International Search Report and Written Opinion for International Application No. PCT/US2020/049274, dated Feb. 1, 2021, 17 pages.
International Search Report and Written Opinion for International Application No. PCT/US2020/061392, dated Mar. 12, 2021, 12 pages.
Non-Final Office Action dated Aug. 3, 2020 for U.S. Appl. No. 16/593,446, filed Oct. 4, 2019, 44 pages.
Non-Final Office Action dated Sep. 6, 2019 for U.S. Appl. No. 16/424,144, filed May 28, 2019, 11 Pages.
Non-Final Office Action dated Apr. 9, 2019 for U.S. Appl. No. 16/258,409, filed Jan. 25, 2019, 71 Pages.
Non-Final Office Action dated Jun. 13, 2019 for U.S. Appl. No. 16/258,279, filed Jan. 25, 2019, 38 Pages.
Non-Final Office Action dated Jan. 16, 2020 for U.S. Appl. No. 16/389,419, filed Apr. 19, 2019, 26 Pages.
Non-Final Office Action dated Jul. 23, 2020 for U.S. Appl. No. 16/593,446, filed Oct. 4, 2019, 28 pages.
Non-Final Office Action dated Nov. 27, 2020 for U.S. Appl. No. 16/258,279, filed Jan. 25, 2019, 44 Pages.
Non-Final Office Action dated Apr. 29, 2019 for U.S. Appl. No. 16/257,979, filed Jan. 25, 2019, 63 Pages.
Non-Final Office Action dated Dec. 30, 2019 for U.S. Appl. No. 16/593,446, filed Oct. 4, 2019, 43 pages.
Notice of Allowance dated Feb. 6, 2020 for U.S. Appl. No. 16/424,144, filed May 28, 2019, 28 Pages.

(56) References Cited

OTHER PUBLICATIONS

Notice of Allowance dated Dec. 16, 2020 for U.S. Appl. No. 16/593,446, filed Oct. 4, 2019, 44 pages.
Notice of Allowance dated May 18, 2020 for U.S. Appl. No. 16/258,279, filed Jan. 25, 2019, 42 Pages.
Amitai Y., "P-27: A Two-Dimensional Aperture Expander for Ultra-Compact, High-Performance Head-Worn Displays," SID Symposium Digest of Technical Papers, 2005, vol. 36 (1), pp. 360-363.
Ayras P., et al., "Exit Pupil Expander With a Large Field of View Based on Diffractive Optics," Journal of the SID, 2009, vol. 17 (8), pp. 659-664.
Bailey et al., Wearable Muscle Interface Systems, Devices and Methods That Interact With Content Displayed on an Electronic Display, Office Action dated Mar. 31, 2015, for U.S. Appl. No. 14/155,107, 17 pages.
Bailey et al., "Muscle Interface Device and Method for Interacting With Content Displayed on Wearable Head Mounted Displays," Amendment filed Aug. 25, 2015, for U.S. Appl. No. 14/155,087, 10 pages.
Bailey et al., "Muscle Interface Device and Method for Interacting With Content Displayed on Wearable Head Mounted Displays," Amendment filed Aug. 9, 2016, for U.S. Appl. No. 14/155,087, 8 pages.
Bailey et al., "Muscle Interface Device and Method for Interacting With Content Displayed on Wearable Head Mounted Displays," Amendment filed May 17, 2016, for U.S. Appl. No. 14/155,087, 13 pages.
Bailey et al., "Muscle Interface Device and Method for Interacting With Content Displayed on Wearable Head Mounted Displays," Office Action dated Feb. 17, 2016, for U.S. Appl. No. 14/155,087, 16 pages.
Bailey et al., "Muscle Interface Device and Method for Interacting With Content Displayed on Wearable Head Mounted Displays," Office Action dated Jul. 20, 2015, for U.S. Appl. No. 14/155,087, 14 pages.
Bailey et al., "Muscle Interface Device and Method for Interacting With Content Displayed on Wearable Head Mounted Displays," Office Action dated Jul. 8, 2016, for U.S. Appl. No. 14/155,087, 16 pages.
Bailey et al., "Muscle Interface Device and Method for Interacting With Content Displayed on Wearable Head Mounted Displays," Office Action dated Mar. 31, 2015, for U.S. Appl. No. 14/155,087, 15 pages.
Bailey et al., "Muscle Interface Device and Method for Interacting With Content Displayed on Wearable Head Mounted Displays," Preliminary Amendment filed Jan. 28, 2014, for U.S. Appl. No. 14/155,087, 8 pages.
Bailey et al., "Wearable Muscle Interface Systems, Devices and Methods That Interact With. Content Displayed on an Electronic Display," Amendment filed Aug. 9, 2016, for U.S. Appl. No. 14/155,107, 8 pages.
Bailey et al., Wearable Muscle Interface Systems, Devices and Methods That Interact With Content Displayed On an Electronic Display/ Office Action dated Feb. 11, 2016, for U.S. Appl. No. 14/155,107, 20 pages.
Bailey et al., Wearable Muscle Interface Systems, Devices and Methods That Interact With Content Displayed on an Electronic Display, Office Action dated Jul. 16, 2015, for U.S. Appl. No. 14/155,107, 20 pages.
Bailey et al., Wearable Muscle Interface Systems, Devices and Methods That Interact With Content Displayed on an Electronic Display/ Office Action dated Jul. 8, 2016, for U.S. Appl. No. 14/155,107, 21 pages.
Chellappan K.V., et al., "Laser-Based Displays: A Review," Applied Optics, Sep. 1, 2010, vol. 49 (25), pp. F79-F98.
Co-Pending U.S. Appl. No. 16/430,299, filed Jun. 3, 2019, 42 Pages.
Cui L., et al., "Diffraction From Angular Multiplexing Slanted Volume Hologram Gratings," Optik, 2005, vol. 116, pp. 118-122.

Curatu C., et al., "Dual Purpose Lens for an Eye-Tracked Projection Head-Mounted Display," International Optical Design Conference SPIE-OSA, 2006, vol. 6342, p. 63420X-1-63420X-7.
Curatu C., et al., "Projection-Based Head-Mounted Display With Eye-Tracking Capabilities," Proceedings of SPIE, 2005, vol. 5875, pp. 58750J-1-58750J-9.
Essex D., "Tutorial on Optomechanical Beam Steering Mechanisms," OPTI 521 Tutorial, College of Optical Sciences, University of Arizona, 2006, 8 pages.
Fernandez E., et al., "Optimization of a Thick Polyvinyl Alcohol-Acrylamide Photopolymer for Data Storage Using a Combination of Angular and Peristrophic Holographic Multiplexing," Applied Optics, Oct. 10, 2009, vol. 45 (29), pp. 7661-7666.
Final Office Action dated Jan. 3, 2019 for U.S. Appl. No. 14/465,194, filed Aug. 21, 2014, 61 Pages.
Final Office Action dated Jan. 10, 2018 for U.S. Appl. No. 14/465,194, filed Aug. 21, 2014, 50 Pages.
Final Office Action dated Nov. 18, 2020 for U.S. Appl. No. 14/461,044, filed Aug. 15, 2014, 14 Pages.
Final Office Action dated Oct. 21, 2021 for U.S. Appl. No. 16/899,843, filed Jun. 12, 2020, 29 Pages.
Final Office Action dated Jul. 23, 2021 for U.S. Appl. No. 14/461,044, filed Aug. 15, 2014, 15 Pages.
Final Office Action received for U.S. Appl. No. 14/155,087 dated Dec. 16, 2016, 32 pages.
Final Office Action received for U.S. Appl. No. 14/155,087 dated Jul. 20, 2015, 27 pages.
Final Office Action received for U.S. Appl. No. 14/155,087 dated Jul. 8, 2016, 27 pages.
Final Office Action received for U.S. Appl. No. 14/155,087 dated Nov. 27, 2017, 40 pages.
Final Office Action received for U.S. Appl. No. 14/155,107 dated Dec. 19, 2016, 35 pages.
Final Office Action received for U.S. Appl. No. 14/155,107 dated Jan. 17, 2019, 46 pages.
Final Office Action received for U.S. Appl. No. 14/155,107 dated Jul. 16, 2015, 28 pages.
Final Office Action received for U.S. Appl. No. 14/155,107 dated Jul. 8, 2016, 31 pages.
Final Office Action received for U.S. Appl. No. 14/155,107 dated Nov. 27, 2017, 44 pages.
First Office Action dated Nov. 25, 2020, for Canadian Application No. 2921954, filed Aug. 21, 2014, 4 pages.
Hainich R.R., et al., "Chapter 10: Near-Eye Displays," Displays: Fundamentals & Applications, AK Peters/CRC Press, 2011, 65 pages.
Hornstein S., et al., "Maradin's Micro-Mirror—System Level Synchronization Notes," SID Digest, 2012, pp. 981-984.
"IEEE 100 The Authoritative Dictionary of IEEE Standards Terms," Seventh Edition, Standards Information Network IEEE Press, Dec. 2000, 3 pages.
International Search Report and Written Opinion for International Application No. PCT/US2016/018293, dated Jun. 8, 2016, 17 Pages.
International Search Report and Written Opinion for International Application No. PCT/US2016/018298, dated Jun. 8, 2016, 14 Pages.
International Search Report and Written Opinion for International Application No. PCT/US2016/018299, dated Jun. 8, 2016, 12 Pages.
International Search Report and Written Opinion for International Application No. PCT/US2016/067246, dated Apr. 25, 2017, 10 Pages.
Itoh Y., et al., "Interaction-Free Calibration for Optical See-Through Head-Mounted Displays based on 3D Eye Localization," IEEE Symposium on 3D User Interfaces (3DUI), 2014, pp. 75-82.
Janssen C., "Radio Frequency (RF)," 2013, [Retrieved on Jul. 12, 2017], 2 pages, Retrieved from the Internet: URL: https://web.archive.org/web/20130726153946/https://www.techopedia.com/definition/5083/radio-frequency-rf.
Kessler D., "Optics of Near to Eye Displays (NEDs)," Presentation - Oasis, Tel Aviv, Feb. 19, 2013, 37 pages.

(56) References Cited

OTHER PUBLICATIONS

Krees B.C., et al., "Diffractive and Holographic Optics as Optical Combiners in Head Mounted Displays," UbiComp, Zurich, Switzerland, Sep. 8-12, 2013, pp. 1479-1482.

Kress B., et al., "A Review of Head-Mounted Displays (HMD) Technologies and Applications for Consumer Electronics," Proceedings of SPIE, 2013, vol. 8720, pp. 87200A-1-87200A-13.

Kress B., "Optical Architectures for See-Through Wearable Displays," Presentation, Bay Area SID Seminar, Apr. 30, 2014, 156 pages.

Lake et al., "Method and Apparatus for Analyzing Capacitive EMG and IMU Sensor Signals for Gesture Control," Amendment filed Aug. 21, 2015, for U.S. Appl. No. 14/186,878, 13 pages.

Lake et al., "Method and Apparatus for Analyzing Capacitive EMG and IMU Sensor Signals for Gesture Control," Office Action dated Jun. 17, 2015, for U.S. Appl. No. 14/186,878, 13 pages.

Lake et al.' "Method and Apparatus for Analyzing Capacitive EMG and IMU Sensor Signals for Gesture Control," Preliminary Amendment filed May 9, 2014, for U.S. Appl. No. 14/186,878, 9 pages.

Lake et al., "Method and Apparatus for Analyzing Capacitive EMG and IMU Sensor Signals for Gesture Control," U.S. Appl. No. 14/186,878, filed Feb. 21, 2014, 29 pages.

Lake et al., "Methods and Devices for Combining Muscle Activity Sensor Signals and Inertial Sensor Signals for Gesture-Based Control," Amendment filed Jan. 8, 2016, for U.S. Appl. No. 14/186,889, 16 pages.

Lake et al., "Methods and Devices for Combining Muscle Activity Sensor Signals and Inertial Sensor Signals for Gesture-Based Control," Amendment filed Jul. 13, 2016, for U.S. Appl. No. 14/186,889, 12 pages.

Lake et al., "Methods and Devices for Combining Muscle Activity Sensor Signals and Inertial Sensor Signals for Gesture-Based Control," Office Action dated Jun. 16, 2016, for U.S. Appl. No. 14/186,889, 13 pages.

Lake et al., "Methods and Devices for Combining Muscle Activity Sensor Signals and Inertial Sensor Signals for Gesture-Based Control," Office Action dated Nov. 5, 2015, for U.S. Appl. No. 14/186,889, 11 pages.

Lake et al., "Methods and Devices That Combine Muscle Activity Sensor Signals and Inertial Sensor Signals for Gesture-Based Control," U.S. Appl. No. 14/186,889, filed Feb. 21, 2014, 58 pages.

Levola T., "7.1: Invited Paper: Novel Diffractive Optical Components for Near to Eye Displays," SID Symposium Digest of Technical Papers, 2006, vol. 37 (1), pp. 64-67.

Liao C.D., et al., "The Evolution of MEMS Displays," IEEE Transactions on Industrial Electronics, Apr. 2009, vol. 56 (4), pp. 1057-1065.

Lippert T.M., "Chapter 6: Display Devices: RSD™ (Retinal Scanning Display)," The Avionics Handbook, CRC Press, 2001, 8 pages.

Majaranta P., et al., "Chapters: Eye Tracking and Eye-Based Human-Computer Interaction," Advances in Physiological Computing, Springer-Verlag London, 2014, pp. 39-65.

Morun C., et al., "Systems, Articles, and Methods for Capacitive Electromyography Sensors," U.S. Appl. No. 16/437,351, filed Jun. 11, 2019, 51 pages.

Non-Final Office Action dated Mar. 1, 2018 for U.S. Appl. No. 14/553,657, filed Nov. 25, 2014, 29 Pages.

Non-Final Office Action dated May 2, 2018 for U.S. Appl. No. 15/799,628, filed Oct. 31, 2017, 25 Pages.

Non-Final Office Action dated Oct. 5, 2022 for U.S. Appl. No. 17/576,815, filed Jan. 14, 2022, 14 pages.

Non-Final Office Action dated Nov. 6, 2018 for U.S. Appl. No. 16/057,573, filed Aug. 7, 2018, 14 Pages.

Non-Final Office Action dated Oct. 7, 2022 for U.S. Appl. No. 17/141,646, filed Jan. 5, 2021, 6 pages.

Non-Final Office Action dated Sep. 11, 2019 for U.S. Appl. No. 14/465,194, filed Aug. 21, 2014, 72 Pages.

Non-Final Office Action dated May 12, 2022 for U.S. Appl. No. 16/899,843, filed Jun. 12, 2020, 34 Pages.

Non-Final Office Action dated Sep. 14, 2017 for U.S. Appl. No. 14/539,773, filed Nov. 12, 2014, 28 pages.

Non-Final Office Action dated Aug. 15, 2018 for U.S. Appl. No. 14/465,194, filed Aug. 21, 2014, 64 Pages.

Non-Final Office Action dated Jun. 15, 2020 for U.S. Appl. No. 16/292,609, filed Mar. 5, 2019, 26 Pages.

Non-Final Office Action dated Aug. 17, 2017 for U.S. Appl. No. 14/465,194, filed Aug. 21, 2014, 81 Pages.

Non-Final Office Action dated Dec. 17, 2018 for U.S. Appl. No. 16/137,960, filed Sep. 21, 2018, 10 pages.

Non-Final Office Action dated Jan. 18, 2018 for U.S. Appl. No. 15/799,621, filed Oct. 31, 2017, 10 pages.

Non-Final Office Action dated Jun. 22, 2017 for U.S. Appl. No. 14/461,044, filed Aug. 15, 2014, 21 Pages.

Non-Final Office Action dated Feb. 25, 2021 for U.S. Appl. No. 14/461,044, filed Aug. 15, 2014, 17 Pages.

Non-Final Office Action dated Aug. 28, 2018 for U.S. Appl. No. 16/023,276, filed Jun. 29, 2018, 10 pages.

Non-Final Office Action dated Aug. 28, 2018 for U.S. Appl. No. 16/023,300, filed Jun. 29, 2018, 11 pages.

Non-Final Office Action dated Jun. 28, 2021 for U.S. Appl. No. 16/550,905, filed Aug. 26, 2019, 5 Pages.

Non-Final Office Action received for U.S. Appl. No. 14/155,087 dated Aug. 16, 2016, 28 pages.

Non-Final Office Action received for U.S. Appl. No. 14/155,087 dated Aug. 7, 2017, 28 pages.

Non-Final Office Action received for U.S. Appl. No. 14/155,087 dated Feb. 17, 2016, 26 pages.

Non-Final Office Action received for U.S. Appl. No. 14/155,087 dated Mar. 31, 2015, 22 pages.

Non-Final Office Action received for U.S. Appl. No. 14/155,107 dated Aug. 17, 2016, 37 pages.

Non-Final Office Action received for U.S. Appl. No. 14/155,107 dated Aug. 7, 2017, 34 pages.

Non-Final Office Action received for U.S. Appl. No. 14/155,107 dated Feb. 11, 2016, 42 pages.

Non-Final Office Action received for U.S. Appl. No. 14/155,107 dated Jul. 13, 2018, 45 pages.

Non-Final Office Action received for U.S. Appl. No. 14/155,107 dated Mar. 31, 2015, 26 pages.

Notice of Allowance dated May 1, 2019 for U.S. Appl. No. 16/137,960, filed Sep. 21, 2018, 14 pages.

Notice of Allowance dated Mar. 5, 2019 for U.S. Appl. No. 16/057,573, filed Aug. 7, 2018, 31 Pages.

Notice of Allowance dated Feb. 8, 2019 for U.S. Appl. No. 16/023,276, filed Jun. 29, 2018, 15 pages.

Notice of Allowance dated Mar. 11, 2020 for U.S. Appl. No. 14/465,194, filed Aug. 21, 2014, 29 Pages.

Notice of Allowance dated Jun. 15, 2018 for U.S. Appl. No. 15/799,621, filed Oct. 31, 2017, 27 pages.

Notice of Allowance dated Jul. 18, 2022 for U.S. Appl. No. 16/550,905, filed Aug. 26, 2019, 7 pages.

Notice of Allowance dated Apr. 20, 2022 for U.S. Appl. No. 14/461,044, filed Aug. 15, 2014, 08 pages.

Notice of Allowance dated Sep. 24, 2020 for U.S. Appl. No. 16/292,609, filed Mar. 5, 2019, 20 Pages.

Notice of Allowance dated Mar. 25, 2022 for U.S. Appl. No. 16/550,905, filed Aug. 26, 2019, 7 pages.

Notice of Allowance dated Sep. 25, 2018 for U.S. Appl. No. 14/553,657, filed Nov. 25, 2014, 25 Pages.

Notice of Allowance dated Jan. 28, 2019 for U.S. Appl. No. 16/023,300, filed Jun. 29, 2018, 31 pages.

Notice of Allowance dated Nov. 3, 2022 for U.S. Appl. No. 16/899,843, filed Jun. 12, 2020, 10 pages.

Notice of Allowance dated Mar. 30, 2018 for U.S. Appl. No. 14/539,773, filed Nov. 12, 2014, 17 pages.

Notice of Allowance dated Nov. 30, 2018 for U.S. Appl. No. 15/799,628, filed Oct. 31, 2017, 19 Pages.

Notice of Allowance received for U.S. Appl. No. 14/155,107 dated Aug. 30, 2019, 16 pages.

Office Action dated Sep. 28, 2022 for Chinese Application No. 201780059093.7, filed Jul. 25, 2017, 16 pages.

(56) References Cited

OTHER PUBLICATIONS

Restriction Requirement dated Aug. 8, 2017 for U.S. Appl. No. 14/553,657, filed Nov. 25, 2014, 7 Pages.
Schowengerdt B.T., et al., "Stereoscopic Retinal Scanning Laser Display With Integrated Focus Cues for Ocular Accommodation," Proceedings of SPIE-IS&T Electronic Imaging, 2004, vol. 5291, pp. 366-376.
Silverman N.L., et al., "58.5L: Late-News Paper: Engineering a Retinal Scanning Laser Display with Integrated Accommodative Depth Cues," SID 03 Digest, 2003, pp. 1538-1541.
Takatsuka Y., et al., "Retinal Projection Display Using Diffractive Optical Element," Tenth International Conference on Intelligent Information Hiding and Multimedia Signal Processing, IEEE, 2014, pp. 403-406.
UREY H., "Diffractive Exit-Pupil Expander for Display Applications," Applied Optics, Nov. 10, 2001, vol. 40 (32), pp. 5840-5851.
Urey H., et al., "Optical Performance Requirements for MEMS-Scanner Based Microdisplays," Conferences on MOEMS and Miniaturized Systems, SPIE, 2000, vol. 4178, pp. 176-185.
Viirre E., et al., "The Virtual Retinal Display: A New Technology for Virtual Reality and Augmented Vision in Medicine," Proceedings of Medicine Meets Virtual Reality, IOS Press and Ohmsha, 1998, pp. 252-257.
Wijk U., et al., "Forearm Amputee's Views of Prosthesis Use and Sensory Feedback," Journal of Hand Therapy, Jul. 2015, vol. 28 (3), pp. 269-278.
Written Opinion for International Application No. PCT/US2014/057029, dated Feb. 24, 2015, 9 Pages.

\* cited by examiner

SYSTEMS, ARTICLES AND METHODS FOR WEARABLE ELECTRONIC DEVICES EMPLOYING CONTACT SENSORS

CROSS REFERENCE TO RELATED APPLICATIONS

The Present Application claims priority from U.S. Provisional Patent App. No. 61/887,193, which was filed on Oct. 4, 2013. The Present Application also claims priority from U.S. Provisional Patent App. No. 61/887,812, which was filed on Oct. 7, 2013. The Present Application also claims priority from U.S. Provisional Patent App. No. 61/891,694, which was filed on Oct. 16, 2013. The Present Application also claims priority from U.S. Provisional Patent App. No. 61/897,097, which was filed on Oct. 29, 2013.

The Present Application is a continuation of U.S. patent application Ser. No. 14/505,836, which was filed on Oct. 3, 2014, abandoned on Feb. 7, 2018, and claims priority to the same four provisional patent applications listed in the preceding paragraph.

The Present Application is a continuation-in-part of U.S. patent application Ser No. 14/461,044, which was filed on Aug. 15, 2014 and claims priority from U.S. Provisional Patent App. No. 61/866,960, which was filed on Aug. 16, 2013.

The Present Application is also a continuation-in-part of U.S. patent application Ser. No. 14/465,194, which was filed on Aug. 21, 2014, abandoned on Jun. 30, 2020, and claims priority from U.S. Provisional Patent App. No. 61/869,526, which was filed on Aug. 23, 2013.

The Present Application is also a continuation-in-part of U.S. patent application Ser. No. 15/799,621, which was filed on Oct. 31, 2017, issued as U.S. Pat. No. 10,101,809 on Oct. 16, 2018, and is a division of U.S. patent application Ser. No. 14/539,773, which was filed on Nov. 12, 2014, issued as U.S. Pat. No. 10,042,422 on Aug. 7, 2018, and claims priority from U.S. Provisional Patent App. No. 61/903,238, which was filed on Nov. 12, 2013.

The Present Application is also a continuation-in-part of U.S. patent application Ser. No. 15/799,628, which was filed on Oct. 31, 2017, issued as U.S. Pat. No. 10,251,577 on Apr. 9, 2019, and is a division of U.S. patent application Ser. No. 14/553,657, which was filed on Nov. 25, 2014, issued as U.S. Patent No. 10,188,309 on Jan. 29, 2019, and claims priority from U.S. Provisional Patent App. No. 61/909,786, which was filed on Nov. 27, 2013.

The Present Application is also a continuation-in-part of U.S. patent application Ser. No. 14/155,107, which was filed on Jan. 14, 2014, issued as U.S. Patent No. 10,528,135 on Jan. 7, 2020, and claims priority from U.S. Provisional Patent App. No. 61/752,226, which was filed on Jan. 14, 2013.

BACKGROUND

Technical Field

The present systems, articles and methods generally relate to wearable electronic devices having on-board sensors, and particularly relate to wearable electronic devices that incorporate one or more contact sensor(s) of any one or more of a variety of different types.

Description of the Related Art

Wearable Electronic Devices

Electronic devices are commonplace throughout most of the world today. Advancements in integrated circuit technology have enabled the development of electronic devices that are sufficiently small and lightweight to be carried by the user. Such "portable" electronic devices may include on-board power supplies (such as batteries or other power storage systems) and may be designed to operate without any wire-connections to other electronic systems; however, a small and lightweight electronic device may still be considered portable even if it includes a wire-connection to another electronic system. For example, a microphone may be considered a portable electronic device whether it is operated wirelessly or through a wire-connection.

The convenience afforded by the portability of electronic devices has fostered a huge industry. Smartphones, audio players, laptop computers, tablet computers, and ebook readers are all examples of portable electronic devices. However, the convenience of being able to carry a portable electronic device has also introduced the inconvenience of having one's hand(s) encumbered by the device itself. This problem is addressed by making an electronic device not only portable, but wearable.

A wearable electronic device is any portable electronic device that a user can carry without physically grasping, clutching, or otherwise holding onto the device with their hands. For example, a wearable electronic device may be attached or coupled to the user by a strap or straps, a band or bands, a clip or clips, an adhesive, a pin and clasp, an article of clothing, tension or elastic support, an interference fit, an ergonomic form, etc. Examples of wearable electronic devices include digital wristwatches, electronic armbands, electronic rings, electronic ankle-bracelets or "anklets," head-mounted electronic display units, hearing aids, and so on.

Human-Electronics Interfaces

A wearable electronic device may provide direct functionality for a user (such as audio playback, data display, computing functions, etc.) or it may provide electronics to interact with, receive information from, or control another electronic device. For example, a wearable electronic device may include sensors that detect inputs effected by a user and transmit signals to another electronic device based on those inputs. Sensor-types and input-types may each take on a variety of forms, including but not limited to: tactile sensors (e.g., buttons, switches, touchpads, or keys) providing manual control, acoustic sensors providing voice-control, electromyography sensors providing gesture control, and/or accelerometers providing gesture control.

A human-computer interface ("HCI") is an example of a human-electronics interface. The present systems, articles, and methods may be applied to HCIs, but may also be applied to any other form of human-electronics interface.

Smart Watches

The concept of a wristwatch with on-board computation capabilities and functionality beyond timekeeping (i.e., a "smart watch") has been around for decades. Seiko and Casio were building digital wristwatches with user-programmable memory and computing capability as far back as in the 1980s. However, at least as a consequence of their limited functionality, the initial designs for smart watches never took off in consumer markets.

Motivated by the availability of more advanced integrated circuit, display, and battery technologies, there has recently been a resurgence in the smart watch industry. Exemplary smart watches that are currently known to be under development include: the Apple Watch, the Samsung Galaxy Gear™, the Sony SmartWatch™, the Qualcomm Toq™, and the Pebble™ by Pebble Technology. Each of these examples provides (or is expected to provide) various functions and capabilities and employs a unique design and geometry. However, all of these designs are fundamentally similar in that they essentially emulate the design of a traditional wristwatch. That is, each design comprises a housing that is physically coupled to a strap or band that fits around the user's wrist, the housing having a display on one side and a back-plate proximate the user's wrist on the side opposite the display. Conforming to this generic arrangement is a design constraint for virtually any smart watch, as most smart watches are designed to resemble the traditional wristwatch as much as possible.

The back-plate that is common to all known wristwatch designs (both traditional and smart watches alike) provides structural support and protects the internal components (circuitry or gears, etc.) of the wristwatch from its environment. Otherwise, the back-plate that is common to all known wristwatch designs does not typically provide or enable other functions and/or capabilities of the wristwatch. Similarly, the strap or band (or similar, hereafter "watchstrap") that is common to virtually all known wristwatch designs (both traditional and smart watches alike) typically serves one purpose: holding the watch in position on the user's wrist. Beyond this, the watchstrap that is common to virtually all known wristwatch designs does not typically impart or enable any functionality or capability in the watch itself.

Contact Sensors

The human body generates electrical signals that may be non-invasively sensed by sensors that physically contact the user's skin (either directly or through an electrically insulative medium such as a dielectric layer). Such "contact sensors" may couple to these electrical signals through, for example, capacitive coupling or via non-capacitive coupling for instance resistive coupling and/or galvanic coupling. This property is exploited in, for example, electromyography ("EMG") sensors that detect the electrical signals produced by a user's muscles when the user performs a physical gesture. The human body also has a capacitance of its own (i.e., the "body capacitance") that enables it to store charge and act as a capacitor. This property is exploited in some capacitive touch sensing technologies, such as in the capacitive touchscreens of many portable electronic devices today. Typical capacitive touchscreens employ a conductive screen that is excited by an electrical signal at a single, fixed frequency. When a user touches the screen, the body capacitance of the user causes changes in this signal that are detected by a sensing circuit. Throughout the remainder of this specification and the appended claims, capacitive touch sensors that employ a single electrical frequency are referred to as "single-frequency capacitive touch sensors."

Recently, a new type of touch sensing technology that employs a range of electrical signal frequencies has been developed by Disney Research. Dubbed "Touché," this new type of touch sensing technology takes advantage of the fact that different types of touch events may have different effects at different signal frequencies. The electrical signal that is used to excite the conductive screen is swept over a continuous range of electrical signal frequencies and the sensing circuit monitors changes in the corresponding return signal at various frequencies over the sweep. In this way, a frequency profile of the touch event is established, where each detectably-different type of touch event (e.g., one finger, two finger, pinch, swipe, etc.) produces a unique frequency profile that may be identified using, for example, machine intelligence algorithms, pattern recognition algorithms, and the like. Throughout the remainder of this specification and the appended claims, capacitive touch sensors that sweep over a continuous range of electrical frequencies in this manner are referred to as "swept frequency capacitive touch sensors." Swept frequency capacitive touch sensors are described in, for example, Sato et al., "Touché: Enhancing Touch Interaction on Humans, Screens, Liquids, and Everyday Objects," presented at CHI '12, May 5-10, 2012 and available online: http://www.disneyresearch.com/project/touche-touch-and-gesture-sensing-for-the-real-world/(last accessed Sep. 29, 2014), which is incorporated by reference herein in its entirety.

Each different type of capacitive sensor described above may be implemented by substantially similar hardware. Essentially, at least one electrically conductive element (such as a plate of electrically conductive material or a conductive screen) is provided as a contact sensor or electrode and is electrically coupled to circuitry (e.g., electrical or electronic circuitry) by at least one electrically communicative pathway. Depending on the implementation, the electrically conductive material of an electrode may be bare and physically contact the skin of the user directly, or the electrically conductive material may be coated with an insulative layer (such as a dielectric layer) that physically couples to the skin of the user. At least one aspect that is unique to each of the different sensor types described above is the nature and function of the circuitry to which the at least one electrically conductive element is coupled.

In general, sensors that are responsive to and detect signals produced, generated, or otherwise effected by the human body are referred to herein as "biometric sensors." Contact sensors are examples of biometric sensors that couple to the user's skin, and capacitive sensors (e.g., capacitive biometric sensors) are examples of contact sensors; however, other forms of contact sensors may couple to the user's skin through other means, such as through resistive coupling.

BRIEF SUMMARY

A wristwatch may be summarized as including: a housing having a top surface that includes a display and an inner cavity that includes a timekeeping device; and a watchstrap that is flexible and carries a set of components and a set of communication pathways, the watchstrap physically coupled to the housing, wherein the set of components includes at least one contact sensor (e.g., at least one biometric contact sensor) and at least one communication terminal, and wherein the at least one communication terminal is communicatively coupled to the at least one contact sensor by at least one communication pathway in the set of communication pathways. The set of components carried by the watchstrap may further include at least one component selected from the group consisting of: a battery, an inductive charging element, an inertial sensor, a pedometer, a compass, a Global Position System unit, an altimeter, a digital processor, and a non-transitory processor-readable storage medium. The set of components carried by the watchstrap may include a digital processor communicatively coupled to the at least one contact sensor and a non-transitory processor-readable storage medium communicatively coupled to the digital processor, and the non-transitory processor-readable storage medium may store processor-executable contact sensing instructions that, when executed by the digital processor, cause the digital processor to process signals received from the at least one contact sensor.

The at least one contact sensor may be carried on a first surface of the watchstrap, the first surface in physical contact with a user when the watchstrap is worn around a wrist of the user. The set of components carried by the watchstrap may include at least one component that is carried on a second surface of the watchstrap, the second surface opposite the first surface. The set of components carried by the watchstrap may include at least one component that is carried within the watchstrap.

The at least one contact sensor may include at least one capacitive biometric sensor selected from the group consisting of: an electromyography sensor, a single-frequency capacitive touch sensor, and a multi-frequency capacitive touch sensor. The display may include at least one of: a window, a digital display screen, and/or a touchscreen. The at least one communication terminal may include a wireless communication terminal.

The at least one communication terminal may include a wired communication terminal. The housing may include circuitry and at least one component in the set of components carried by the watchstrap may be communicatively coupled to the circuitry of the housing through the wired communication terminal.

A composition of the watchstrap may be selected from the group consisting of: a single piece of flexible material, multiple layers of flexible material, a single piece of elastic material, multiple layers of elastic material, and a set of substantially rigid links physically coupled together by at least one adaptive coupler. Communicative coupling between the at least one contact sensor and the at least one communication terminal may be mediated by at least one additional component in the set of components carried by the watchstrap.

A watchstrap for integration into a wristwatch may be summarized as including: a flexible strap; a set of communication pathways carried by the strap; and a set of components carried by the strap, the set of components including at least one contact sensor (e.g., at least one biometric contact sensor) and at least one communication terminal, wherein the at least one communication terminal is communicatively coupled to the at least one contact sensor by at least one communication pathway in the set of communication pathways. The set of components carried by the strap may further include any or all of: a battery communicatively coupled to the at least one contact sensor by at least one communication pathway in the set of communication pathways; an inductive charging element communicatively coupled to the at least one contact sensor by at least one communication pathway in the set of communication pathways; an inertial sensor communicatively coupled to the at least one communication terminal by at least one communication pathway in the set of communication pathways; and/or a pedometer communicatively coupled to the at least one communication terminal by at least one communication pathway in the set of communication pathways.

The set of components carried by the strap may include: a digital processor communicatively coupled to the at least one contact sensor; and a non-transitory processor-readable storage medium communicatively coupled to the digital processor, wherein the non-transitory processor-readable storage medium stores processor-executable contact sensing instructions that, when executed by the digital processor, cause the digital processor to process signals received from the at least one contact sensor.

The at least one contact sensor may include at least one capacitive biometric sensor selected from the group consisting of: an electromyography sensor, a single-frequency capacitive touch sensor, and a multi-frequency capacitive touch sensor. The strap may be sized and dimensioned to mate with a wristwatch housing. The at least one contact sensor may include multiple contact sensors. The at least one communication terminal may include at least one of a wireless communication terminal and/or a wired communication terminal. Communicative coupling between the at least one contact sensor and the at least one communication terminal may be mediated by at least one additional component in the set of components carried by the strap.

The strap may include a first surface and a second surface, and at least one component in the set of components carried by the strap may be carried on the first surface of the strap and at least one component in the set of components carried by the strap may be carried on the second surface of the strap. At least one component in the set of components carried by the strap may be carried within the strap.

A wristwatch may be summarized as including: a wristband; a housing physically coupled to the wristband, the housing comprising: a top surface that includes a display; and a back-plate formed of a substantially rigid material and positioned underneath the top surface, wherein the back-plate and the top surface together define a cavity therebetween, and wherein the back-plate includes a first surface that carries at least one contact sensor (e.g., at least one biometric contact sensor) and a second surface that carries circuitry, the second surface opposite the first surface and the circuitry contained within the cavity and communicatively coupled to the at least one contact sensor; and a digital processor contained within the cavity, the digital processor communicatively coupled to the circuitry. The housing may further comprise at least one sidewall formed of a substantially rigid material, the at least one sidewall providing physical coupling between the top surface and the back-plate, wherein the top surface, the back-plate, and the at least one sidewall form a hollow volume that encompasses the cavity.

The housing may have a geometry with a two-dimensional projection that is selected from the group consisting of: substantially square, substantially rectangular, substantially circular, and substantially polygonal. The housing may be substantially planar.

The housing may further comprise at least one component selected from the group consisting of: a battery contained within the cavity, a wireless transmitter, an inductive charging element contained within the cavity, an inertial sensor contained within the cavity, a pedometer contained within the cavity, and a non-transitory processor-readable storage medium contained within the cavity. The housing may include a non-transitory processor-readable storage medium contained within the cavity, and the non-transitory processor-readable storage medium may store processor-executable contact sensing instructions that, when executed by the digital processor, cause the digital processor to process signals received from the at least one contact sensor. The at least one component may be carried by the second surface of the back-plate.

The at least one contact sensor may include at least one capacitive biometric sensor selected from the group consisting of: an electromyography sensor, a single-frequency capacitive touch sensor, and a multi-frequency capacitive touch sensor. The display may include at least one of: a window, a digital display screen, and/or a touchscreen. The circuitry carried by the second surface of the back-plate may be communicatively isolated from the display, and the circuitry carried by the second surface of the back-plate may include the digital processor and a wireless transmitter communicatively coupled to the digital processor.

A back-plate for integration into a wristwatch may be summarized as including: a plate of substantially rigid material; at least one contact sensor (e.g., at least one biometric contact sensor) carried on a first side of the plate; circuitry carried on a second side of the plate, the second side opposite the first side, wherein the at least one contact sensor is communicatively coupled to the circuitry; and at least one component selected from the group consisting of: a tethered connector port communicatively coupled to the circuitry, the tethered connector port to in use communicatively couple to at least one electrical or electronic component of a wristwatch; and a wireless transmitter communicatively coupled to the circuitry, the wireless transmitter to in use wirelessly transmit data provided by the at least one contact sensor. The back-plate may further include any or all of: a battery carried on the second side of the plate and communicatively coupled to the circuitry; an inductive charging element carried on the second side of the plate and communicatively coupled to the circuitry; an inertial sensor carried on the second side of the plate and communicatively coupled to the circuitry; and/or a pedometer carried on the second side of the plate and communicatively coupled to the circuitry.

The back-plate may include a non-transitory processor-readable storage medium carried on the second side of the plate, wherein the non-transitory processor-readable storage medium stores processor-executable contact sensing instructions that, when executed by a processor, cause the processor to process signals received from the at least one contact sensor. The back-plate may further include a digital processor carried on the second side of the plate and communicatively coupled to both the circuitry and the non-transitory processor-readable storage medium.

The at least one contact sensor may include at least one capacitive biometric sensor selected from the group consisting of: an electromyography sensor, a single-frequency capacitive touch sensor, and a multi-frequency capacitive touch sensor. The plate may be sized and dimensioned to mate with a wristwatch housing and to provide an underside thereof. The at least one contact sensor may include multiple contact sensors. The plate may be substantially planar in geometry.

A wearable electronic device may be summarized as including: at least one electromyography ("EMG") sensor responsive to muscle activity corresponding to a gesture performed by a user of the wearable electronic device and to provide signals in response thereto; at least one capacitive touch sensor responsive to physical contact between the user and an object and to provide signals in response thereto; a processor communicatively coupled to the at least one EMG sensor and to the at least one capacitive touch sensor; and a non-transitory processor-readable storage medium communicatively coupled to the processor, the non-transitory processor-readable storage medium storing: processor-executable gesture identification instructions that, when executed by the processor, cause the processor to identify a gesture performed by the user based at least in part on signals provided by the at least one EMG sensor; and processor-executable touch sensing instructions that, when executed by the processor, cause the processor to process signals provided by the at least one capacitive touch sensor. The at least one capacitive touch sensor may include a single-frequency capacitive touch sensor, a multi-frequency capacitive touch sensor, and/or a swept frequency capacitive touch sensor.

The wearable electronic device may further include at least one communication terminal communicatively coupled to the processor, the at least one communication terminal to transmit signals to a receiving device, wherein the signals are based on at least one of: signals provided by the at least one EMG sensor and/or signals provided by the at least one capacitive touch sensor. The wearable electronic device may include at least one inertial sensor communicatively coupled to the processor, the at least one inertial sensor responsive to motion corresponding to the gesture performed by the user of the wearable electronic device and to provide at least one signal in response thereto, wherein the processor-executable gesture identification instructions that, when executed by the processor, cause the processor to identify the gesture performed by the user based at least in part on signals provided by the at least one EMG sensor cause the processor to identify the gesture performed by the user based at least in part on both signals provided by the at least one EMG sensor and at least one signal provided by the at least one inertial sensor.

The wearable electronic device may comprise a set of pod structures that form physically coupled links of the wearable electronic device, wherein each pod structure in the set of pod structures is positioned adjacent and in between two other pod structures in the set of pod structures and physically coupled to the two other pod structures in the set of pod structures, and wherein the set of pod structures forms a perimeter of an annular configuration.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

DETAILED DESCRIPTION

Figure 1:
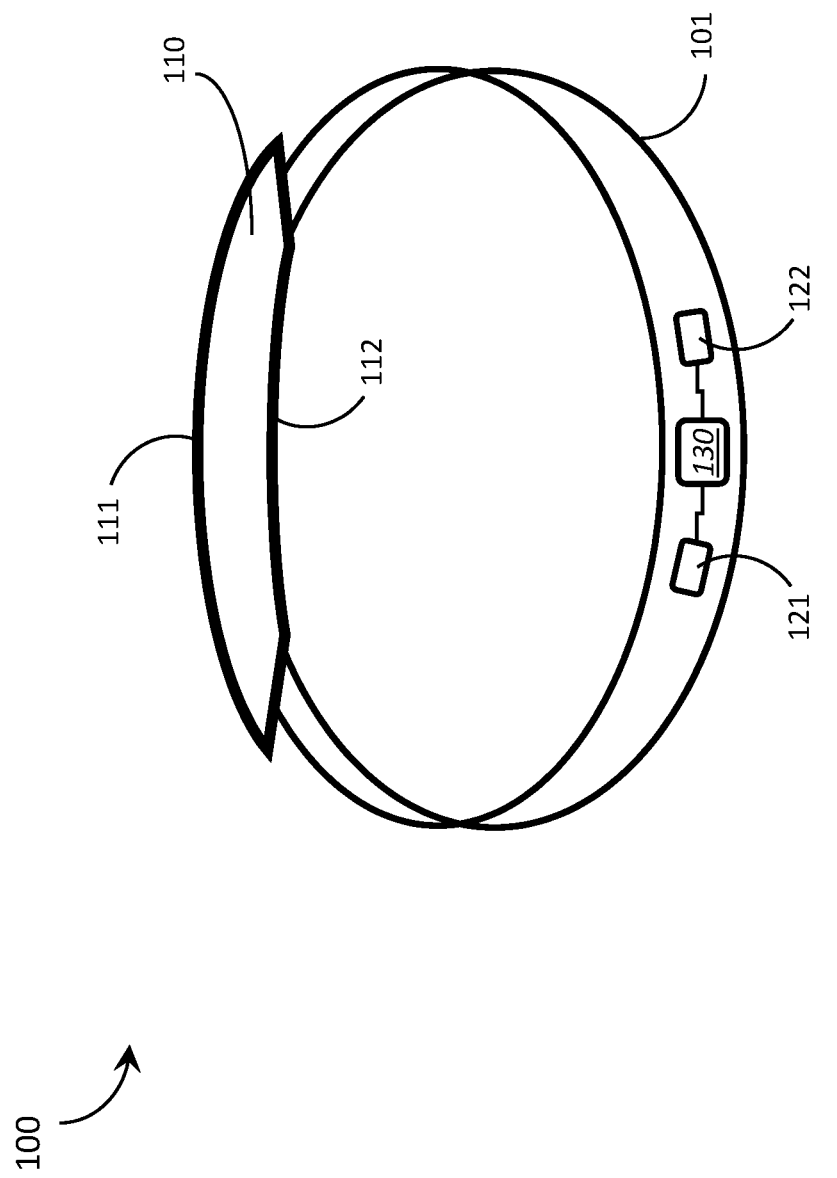
FIG. 1 is a perspective view of an exemplary wristwatch that includes an enhanced watchstrap employing contact sensors in accordance with the present systems, articles, and methods.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with electronic devices, and in particular wearable electronic devices such as wristwatches, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the embodiments.

The various embodiments described herein provide systems, articles, and methods for wearable electronic devices that employ biometric contact sensors. Different types of contact sensors are employed, including without limitation electromyography ("EMG") sensors, single-frequency capacitive touch sensors, and/or swept frequency capacitive touch sensors. Swept frequency capacitive touch sensors are described in, for example, Sato et al.; however, in accordance with the present systems, articles, and methods, the concept of probing multiple electrical frequencies of a capacitive touch sensor may be generalized to implementations that do not actually sweep the electrical frequency over a continuous range, such as implementations that simply probe two or more discrete electrical signal frequencies. Probing multiple discrete signal frequencies without continuously sweeping in between can be advantageous in some applications because such simplifies the electric circuitry involved, simplifies the signal processing involved, and can also be designed to specifically target frequencies that are of particular relevance (e.g., for pattern recognition purposes) to a specific application. Throughout this specification and the appended claims, capacitive touch sensors that implement more than a single, fixed frequency are generally referred to as "multi-frequency capacitive touch sensors," where swept frequency capacitive touch sensors are a subset of multi-frequency capacitive touch sensors, but any implementation of a capacitive touch sensor that is operative to probe multiple distinct electrical signal frequencies (e.g., "bi-frequency capacitive touch sensors" employing two frequencies, "tri-frequency capacitive touch sensors" employing three frequencies, and so on for any number of frequencies) constitutes a multi-frequency capacitive touch sensor herein.

Contact sensors may be incorporated into a dedicated device such as a wearable electronic armband, or they may be incorporated into a device that otherwise provides a different function, such as a wristwatch. For example, the functionality of any wristwatch may be enhanced by incorporating at least one contact sensor into the watchstrap and/or watch housing back-plate. In accordance with the present systems, articles, and methods, a generic watchstrap and/or watch housing back-plate design that includes at least one contact sensor may be adapted to fit to or be used in conjunction with any known wristwatch design, and incorporated into virtually any wristwatch during manufacturing thereof. Such "enhanced" watchstraps and/or back-plates can add capacitive sensing and/or other capabilities to "traditional" watch designs (i.e., non-smart watch designs) to effectively transform the traditional watch into a smart watch, and/or can add new sensing and/or other capabilities to smart watch designs.

In accordance with the present systems, articles, and methods, one or more EMG sensor(s) may be used to detect electrical activity produced by the muscles of a user when the user performs a physical gesture and to enable a wearable electronic device that includes the one or more EMG sensor(s) to transmit gesture-specific signals to a receiving device as part of a human-electronics interface. One or more capacitive touch sensor(s) (such as one or more single-frequency capacitive touch sensor(s) and/or one or more multi-frequency capacitive touch sensor(s)) may be used to detect physical contact between a user and an object (i.e., when and/or how a user physically touches an object), to provide signals in response to the detected physical contact, and to enable a wearable electronic device that includes the one or more capacitive touch sensor(s) to transmit touch-specific signals to a receiving device as part of a human-electronics interface.

FIG. 1 is a perspective view of an exemplary wristwatch 100 that includes an enhanced watchstrap 101 in accordance with the present systems, articles, and methods. Enhanced watchstrap 101 enwraps the wrist of a user to secure wristwatch 100 in position on the user's wrist, in much the same way as any generic watchstrap. Enhanced watchstrap 101 may be elastic, fabric, cloth, leather, formed of serially-coupled links, or any other flexible material and may or may not include a latch, clasp, or other fastening device (not shown in FIG. 1). Wristwatch 100 also includes a housing 110 having a top surface 111 and a back-plate 112. Back-plate 112 may be a simple rigid surface with no further functionality or back-plate 112 may be an enhanced back-plate as described in U.S. Provisional Patent Application Ser. No. 61/887,193 and/or U.S. Provisional Patent Application Ser. No. 61/887,812, each of which is incorporated herein by reference in its entirety.

The top surface 111 of housing 110 includes a window or display that may provide a means of conveying information to a user (such as the time, etc.) and/or an interface through which the user may program and/or control functions of wristwatch 100. For example, wristwatch 100 may be a traditional analog or mechanical watch, in which case the display of the top surface 111 of housing 110 may include a simple sheet of transparent material such as glass or plastic (commonly referred to as the "crystal") forming a window through which the hands of an analog watch face may be seen by the user, or wristwatch 100 may be a traditional digital watch, in which case the display of the top surface 111 of housing 110 may include a digital display screen, or wristwatch 100 may be a smart watch, in which case the display of the top surface 111 of housing 110 may include a touchscreen. Housing 110 may include an inner cavity that contains a timekeeping device, including without limitation: one or more gear(s), one or more clockwork(s), one or more quartz oscillator(s), and/or any other component or device known in the art of timekeeping. In some implementations, the cavity may include circuitry (e.g., electrical and/or electronic circuitry). Wristwatch 100 may be substantially similar to any known wristwatch except that wristwatch 100 includes enhanced watchstrap 101 providing additional functions and/or capabilities in accordance with the present systems, articles, and methods.

Exemplary enhanced watchstrap 101 includes on-board devices 121 122, and 130. In principle, the enhanced watchstraps of the present systems, articles, and methods may include any number of devices. Exemplary devices 121 and 122 are contact sensors or transducers (hereafter "contact sensors") that may be used to detect, measure, monitor, or otherwise sense one or more activity(ies), parameter(s), characteristic(s), and/or other aspect(s) of the user of (i.e., the wearer of) wristwatch 100. Two contact sensors 121 and 122 are illustrated in FIG. 1 for exemplary purposes only. In practice, any number (e.g., one, two, three, or more than three) of contact sensors may be included in watchstrap 101.

Contact sensors 121, 122 may include any type or types of contact sensors, including without limitation one or more EMG sensor(s), one or more single-frequency capacitive touch sensor(s), and/or one or more multi-frequency capacitive touch sensor(s), one or more magnetomyography sensor(s), one or more acoustic myography sensor(s), one or more mechanomyography sensor(s), one or more electrocardiography sensor(s), one or more blood pressure sensor(s), one or more thermometer(s), and/or one or more skin conductance sensor(s). Contact sensors 121, 122 may include any type or types of biometric sensor(s) that are responsive to signals detected through physical contact with the user's skin. Enhanced watchstrap 101 may, if desired, also include one or more other form(s) of sensor(s), such as one or more pedometer(s), one or more inertial sensor(s) such as one or more accelerometer(s) and/or one or more gyroscope(s), one or more compass(es), one or more location sensor(s) such as one or more Global Positioning System (GPS) unit(s), one or more altimeter(s), and so on.

Exemplary device 130 is circuitry (e.g., electrical and/or electronic circuitry) that is communicatively coupled to contact sensors 121, 122 and may include a wide variety of components depending on the specific implementation. In exemplary wristwatch 100, circuitry 130 includes an amplification circuit to amplify signals provided by contact sensors 121 and 122, a filtering circuit to filter signals provided by contact sensors 121 and 122, an analog-to-digital converter to convert analog signals provided by contact sensors 121 and 122 into digital signals, a digital processor to process the signals provided by contact sensors 121 and 122, and a non-transitory processor-readable storage medium or memory to store processor-executable instructions that, when executed by the digital processor in circuitry 130, cause the digital processor in circuitry 130 to process the signals provided by contact sensors 121 and 122. In other implementations, the circuitry of an enhanced watchstrap in accordance with the present systems, articles, and methods may include other components in addition to or instead of the components included in circuitry 130 of enhanced watchstrap 101, including without limitation: one or more battery(ies), one or more inductive charging elements, and/or one or more communication terminal(s) such as one or more wireless transmitter(s) and/or receiver(s) (either separately or combined as a wireless transceiver) employing a wireless communication protocol such as Bluetooth®, WiFi™, and/or NFC™, one or more tethered connector port(s) (e.g., one or more Universal Serial Bus (USB) port(s), one or more mini-USB port(s), one or more micro-USB port(s), and/or one or more Thunderbolt® port(s)), and/or any other form or forms of communication terminal(s), such as without limitation: one or more socket(s), one or more bonding pad(s), one or more set(s) of pins, and the like.

Any or all of on-board devices 121, 122, and/or 130 may be carried, in whole or in part, on a first surface (i.e., a "contact surface" that is in contact with a user's skin when wristwatch 100 is worn directly on a wrist of the user) of enhanced watchstrap 101. While the electrodes of contact sensors 121 and 121 generally need to contact the user's skin when enhanced watchstrap 101 is worn, further portions of sensors 121, 122 and/or device 130 (in whole or in part), may be carried on a second surface (i.e., a "non-contact surface" that is not in contact with the user's skin when wristwatch 100 is worn directly on the wrist of the user) of enhanced watchstrap 101 and/or carried within enhanced watchstrap 101.

Throughout this specification and the appended claims, the term "inductive charging element" is used to refer to a component of an inductive charging system that is designed to receive power transfer via inductive coupling. A person of skill in the art will appreciate that an inductive charging element may include a coil of conductive wire that receives power transfer when positioned proximate an alternating magnetic field.

Throughout this specification and the appended claims, the term "communication terminal" is generally used to refer to any physical structure that provides a communications link through which a data signal may enter and/or leave a device (or a component of a device, such as enhanced watchstrap 101). A communication terminal represents the end (or "terminus") of communicative signal transfer within a device (or a component of a device) and the beginning of communicative signal transfer with an external device (or a separate component of the device). In the case of a communication terminal in circuitry 130, the term "terminal" means that the communication terminal in circuitry 130 represents the end of communicative signal transfer within/on enhanced watchstrap 101 and the beginning of communicative signal transfer with other components of wristwatch 100 and/or with one or more device(s) separate from wristwatch 100 (e.g., one or more smartphone(s), one or more desktop, laptop, or tablet computer(s), etc.).

Figure 2A:
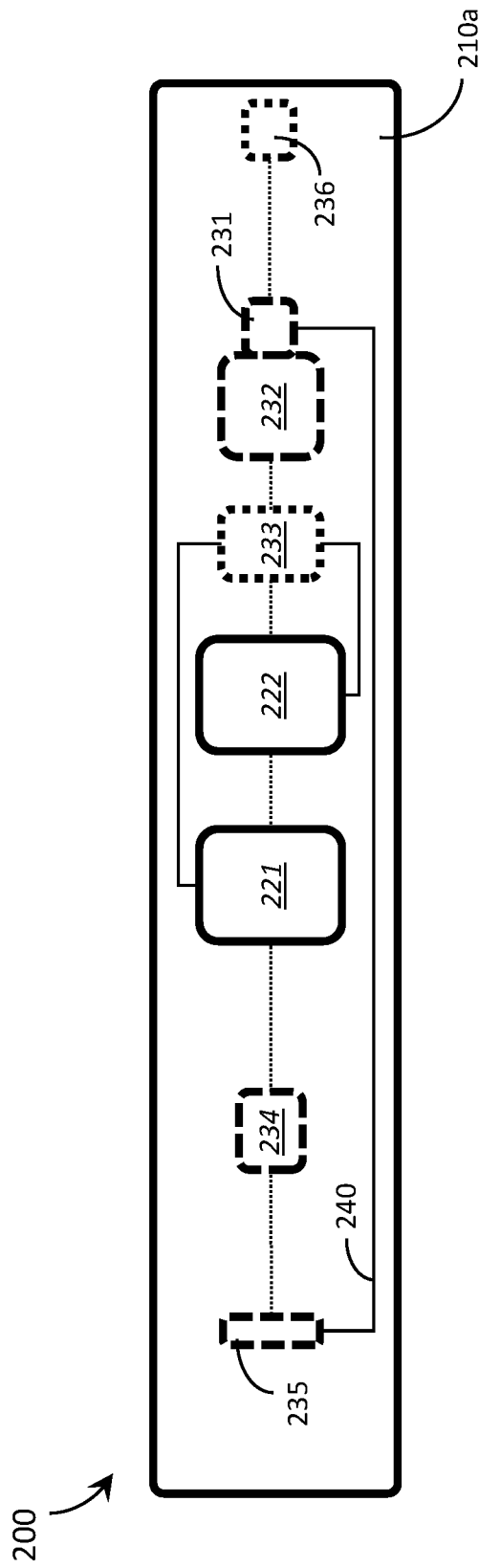
FIG. 2A is a plan view showing a contact surface of an exemplary enhanced watchstrap in accordance with the present systems, articles, and methods.

FIG. 2A is a plan view showing a contact surface 210a of an exemplary enhanced watchstrap 200 in accordance with the present systems, articles, and methods. Watchstrap 200 may be designed and/or adapted to fit or otherwise mate with any wristwatch (e.g., any mechanical, digital, analog, or smart watch housing, not shown in FIG. 2A) in a substantially similar way to that described for enhanced strap 101 of wristwatch 100 from FIG. 1. As FIG. 2A depicts the contact surface 210a of watchstrap 200 (i.e., the surface of strap 200 that contacts the user when strap 200 is worn), the bottom surface of watchstrap 200 is not visible in FIG. 2A; however, some features and devices that are included on the bottom surface of watchstrap 200 and within watchstrap 200 are illustrated in FIG. 2A for discussion purposes but shown in broken, dashed lines in FIG. 2A to indicate that such features and devices may not actually be visible in the plan view of FIG. 2A.

In accordance with the present systems, articles, and methods, a watchstrap for integration with a wristwatch may include at least one contact sensor, and thereby provide enhanced functionality/capability for the wristwatch. Enhanced watchstrap 200 includes contact sensors 221 and 222. Contact sensors 221 and 222 may include, for example, electromyography sensors such as those described in U.S. Provisional Patent Application Ser. No. 61/771,500 (now U.S. Non-Provisional patent application Ser. No. 14/194,252), U.S. Provisional Patent Application Ser. No. 61/903,238, and/or U.S. Provisional Patent Application Ser. No. 61/909,786, each of which is incorporated by reference herein in its entirety. Either instead of or in addition to EMG sensors, contact sensors 221, 222 may include any type or types of biometric sensor(s) that are responsive to signals detected through physical contact with the user's skin, for example, single-frequency capacitive touch sensors, multi-frequency capacitive touch sensors, magnetomyography sensor(s), and so on (i.e., as described for watchstrap 101 in FIG. 1). In any case, at least an electrode portion of at least one contact sensor 221, 222 is positioned on the contact surface 210a of watchstrap 200 so that the at least one contact sensor 221, 222 may be positioned proximate (e.g., in physical contact with) the skin of the user.

Watchstrap 200 may be sized and dimensioned to mate (e.g., via at least one latch, pin, clasp, connector, or the like) with any wristwatch design to provide a strap or band therefor. The enhanced watchstraps described in the present systems, articles, and methods may comprise a single-piece of material (e.g., elastic material, flexible material, stretchable material, etc.) or multiple segments, links, or sections of material (e.g., rigid or semi-rigid material) adaptively coupled together by at least one adaptive coupler. For ease of illustration, watchstrap 200 in FIG. 2A is formed of a single-piece of flexible material such as fabric, cloth, leather, or similar. Watchstrap 200 may be substantially planar when laid out flat but may generally be curved in use.

The term "adaptive coupler" is used throughout this specification and the appended claims to denote a system, article or device that provides flexible, adjustable, modifiable, extendable, extensible, or otherwise "adaptive" physical coupling. Adaptive coupling is physical coupling between two objects that permits limited motion of the two objects relative to one another. An example of an adaptive coupler is an elastic material such as an elastic band.

The plan view of FIG. 2A depicts the contact surface 210a of watchstrap 200 which carries contact sensors 221 and 222. Additional components (i.e., components 231, 232, 234, and 235 illustrated with wide-dashed lines in FIG. 2A) of watchstrap 200 are carried on a non-contact surface thereof (i.e., the surface of watchstrap 200 that is furthest from and does not contact the skin of the user when worn), and still further components (i.e., components 233 and 236 illustrated with dotted lines in FIG. 2A) of watchstrap 200 are carried in an inner volume thereof. Watchstrap 200 includes communication pathways 240 (only one called out in FIG. 2A to reduce clutter) that couple to and between various components of watchstrap 200 to provide communicative coupling therebetween. Portions of communication pathways 240 may be carried on the contact surface 210a, the non-contact surface, and/or in the inner volume of watchstrap 200. In some embodiments, additional components may be carried on the sides or edges of watchstrap 200.

Throughout this specification and the appended claims the term "communicative" as in "communicative pathway," "communicative coupling," and in variants such as "communicatively coupled," is generally used to refer to any engineered arrangement for transferring and/or exchanging information. Exemplary communicative pathways include, but are not limited to, electrically conductive pathways (e.g., electrically conductive wires, electrically conductive traces), magnetic pathways (e.g., magnetic media), and/or optical pathways (e.g., optical fiber), and exemplary communicative couplings include, but are not limited to, electrical couplings, magnetic couplings, and/or optical couplings. Furthermore, the term "communicatively coupled" is generally used throughout this specification and the appended claims to include direct, 1:1 communicative coupling and indirect or "mediated" communicative coupling. For example, a component A may be communicatively coupled to a component B directly by at least one communication pathway, or a component A may be communicatively coupled to a component B indirectly by at least a first communication pathway that directly couples component A to a component C and at least a second communication pathway that directly couples component C to component B. In this case, component C is said to mediate the communicative coupling between component A and component B.

Figure 2B:
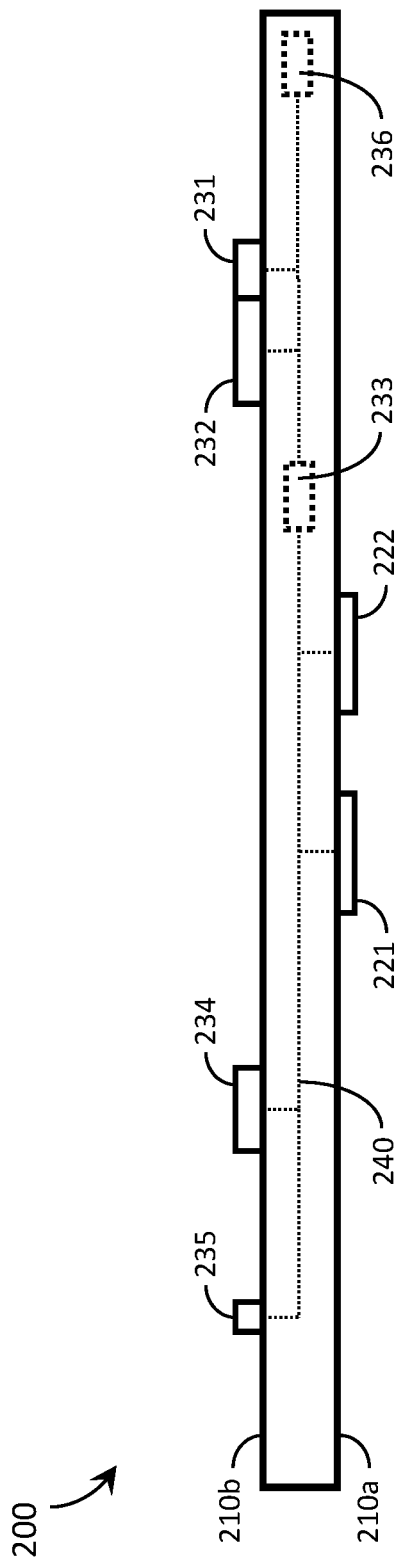
FIG. 2B is a side elevational view of the exemplary enhanced watchstrap from FIG. 2A showing the relative positions of components on the surfaces and in the inner volume thereof, in accordance with the present systems, articles, and methods.

To clarify the spatial arrangement of the components 221, 222, 231, 232, 233, 234, 235, 236, and 240 of watchstrap 200 illustrated in the plan view of FIG. 2A, FIG. 2B provides a side elevational view of the same exemplary watchstrap configuration.

FIG. 2B is a side elevational view of exemplary enhanced watchstrap 200 from FIG. 2A showing the relative positions of components on the surfaces and in the inner volume thereof, in accordance with the present systems, articles, and methods. In the side elevational view of FIG. 2B, both contact surface 210a and non-contact surface 210b of watchstrap 200 are visible. Contact surface 210a carries contact sensors 221 and 222 while non-contact surface 210b carries components 231, 232, 234, and 235. The inner volume of watchstrap 200 carries components 233 and 236, which are illustrated in dotted lines in FIG. 2B to indicate that they might not be visible in the view of FIG. 2B.

Watchstrap 200 provides an illustrative example of an enhanced watchstrap in accordance with the present systems, articles, and methods. In alternative implementations, more or fewer components (including all or no components) may be carried on the contact surface, on the non-contact surface, and/or in the inner volume of an enhanced watchstrap.

With reference to both FIGS. 2A and 2B, watchstrap 200 includes contact sensors 221, 222 that are communicatively coupled by at least one communication pathway 240 to circuitry 233. Circuitry 233 includes at least one of an amplification circuit, a filtering circuit, and/or an analog-to-digital conversion circuit, and is communicatively coupled by at least one communication pathway 240 to an on-board processor 231. Processor 231 is communicatively coupled to a non-transitory processor-readable storage medium or memory 232. Memory 232 stores processor-executable contact sensing instructions that, when executed by processor 231, cause processor 231 to process signals provided by contact sensors 221 and 222. For example, processor-executable contact sensing instructions may, when executed by processor 231, cause processor 231 to perform gesture identification based on EMG sensor signals as described in U.S. Provisional Patent Application Ser. No. 61/881,064 (now U.S. Non-Provisional patent application Ser. No.

14/494,274) and/or U.S. Provisional Patent Application Ser. No. 61/894,263 (each of which is incorporated by reference herein in its entirety) and/or for processing single-frequency and/or multi-frequency capacitive touch sensor signals. Processor 231 is also communicatively coupled (by respective communication pathways 240) to first and second communication terminals 235 and 236. Communication terminal 235 is a wireless communication terminal (e.g., a Bluetooth® transmitter and/or receiver) that enables information from processor 231 to be sent wirelessly to any receiving device, such as a smartphone, computer, etc. Communication terminal 236 is a wired communication terminal that may, for example, provide a direct communicative coupling point between watchstrap 200 and a housing (e.g., housing 110 from FIG. 1) of a wristwatch, where the housing includes a clock face and other watch/smartwatch elements.

Watchstrap 200 also includes at least one power source 234 that is communicatively coupled to all components of watchstrap 200 that require power. Power source 234 may include at least one battery and/or at least one inductive charging element.

Communication pathways 240 may be implemented in a variety of forms. For example, communication pathways 240 may include electrical wires and/or conductive traces. In the latter case, at least one flexible printed circuit board may be carried on at least one surface 210a, 210b of watchstrap 200 and/or in an inner volume of watchstrap 200 and conductive traces 240 may be carried on and/or in the at least one flexible printed circuit board. Stretchable printed circuit boards may be employed, such as those described in U.S. Provisional Patent Application Ser. No. 61/872,569 (now U.S. Non-Provisional patent application Ser. No. 14/471,982), which is incorporated by reference herein in its entirety. Elastic conductors may be employed. In some implementations, watchstrap 200 may essentially comprise a flexible printed circuit board that is formed of bio-compatible material. In implementations in which an enhanced watchstrap is formed of a set of rigid or semi-rigid links that are adaptively coupled together by at least one adaptive coupler, at least one rigid or semi-rigid link may comprise and/or include at least one rigid printed circuit board that carries communication pathways.

A person of skill in the art will appreciate that watchstrap 200 includes one type of contact sensor 221, 222 and six components 231, 232, 233, 234, 235, and 236, though in practice an enhanced watchstrap may carry any number of components (including more or fewer than six components) and any number or type of sensors depending on the functionality provided by the watchstrap.

Enhanced watchstrap 200 may be integrated into any known wristwatch design by substituting for the existing strap or band in the design and, optionally, communicatively coupling to circuitry in the existing design (if such circuitry exists) through communication terminal 236.

Throughout this specification and the appended claims, the term "rigid" as in, for example, "substantially rigid material," is used to describe a material that has an inherent tendency to maintain its shape and resist malformation/deformation under the moderate stresses and strains typically encountered by a wearable electronic device.

The various embodiments of enhanced watchstraps described herein are generic in that they can be adapted to integrate with any known wristwatch design (including traditional watches and smart watches) by, for example, sizing and dimensioning the watchstrap to mate with existing wristwatch components (such as the housing or clock face display) and, optionally, communicatively coupling the electrical components of the watchstrap to existing electrical components of the wristwatch (if such circuitry exists) through a dedicated communication terminal (e.g., terminal 236). In this way, the enhanced straps described herein introduce new components and associated functionality/capability into existing wristwatch designs, thereby transforming virtually any traditional wristwatch design into a smart watch and/or enhancing the functions and capabilities of virtually any smart watch design. In implementations in which an enhanced watchstrap is not communicatively coupled to electrical components of a wristwatch (i.e., in implementations in which communication terminal 236 is not used), the enhanced watchstraps described herein may still communicate with other devices (such as a smartphone, computer, etc.) wirelessly (e.g., using communication terminal 235) and thereby provide enhanced, smart watch-like functionality in an otherwise non-smart watch design.

The present systems, articles, and methods may employ the systems, articles, and methods for processing EMG sensor data described in U.S. Provisional Patent Application Ser. No. 61/768,322 (now U.S. Non-Provisional patent application Ser. No. 14/186,889), U.S. Provisional Patent Application Ser. No. 61/869,526 (now U.S. Non-Provisional patent application Ser. No. 14/465,194), and/or U.S. Provisional Patent Application Ser. No. 61/874,846 (now U.S. Non-Provisional patent application Ser. No. 14/476,093), each of which is incorporated by reference herein in its entirety. In the case of contact sensors that are not EMG sensors (e.g., single-frequency capacitive touch sensors and/or multi-frequency capacitive touch sensors), the systems, articles, and methods of U.S. Provisional Patent Application Ser. Nos. 61/768,322 (now Ser. No. 14/186,889), 61/869,526 (now Ser. No. 14/465,194), and/or 61/874,846 (now Ser. No. 14/476,093) may be readily adapted to accommodate non-EMG based contact sensor data.

As previously described, contact sensors and associated circuitry may be on-board or otherwise packaged with a watch housing back-plate, either on its own or in conjunction with contact sensors packaged with a watchstrap as described in FIGS. 1, 2A, and 2B. For example, the various embodiments described herein provide systems, articles, and methods for generic wristwatch back-plates that may be adapted to fit to any known wristwatch design and incorporated into virtually any wristwatch during manufacturing thereof. The back-plates described herein incorporate various types of contact sensors and thereby enhance the functions and/or capabilities of the wristwatch with which they are integrated. In this way, the back-plates described herein can add sensing and/or other capabilities to "traditional" watch designs (i.e., non-smart watch designs) to effectively transform the traditional watch into a smart watch, and/or the back-plates described herein can add new sensing and/or other capabilities to smart watch designs.

Figure 3:
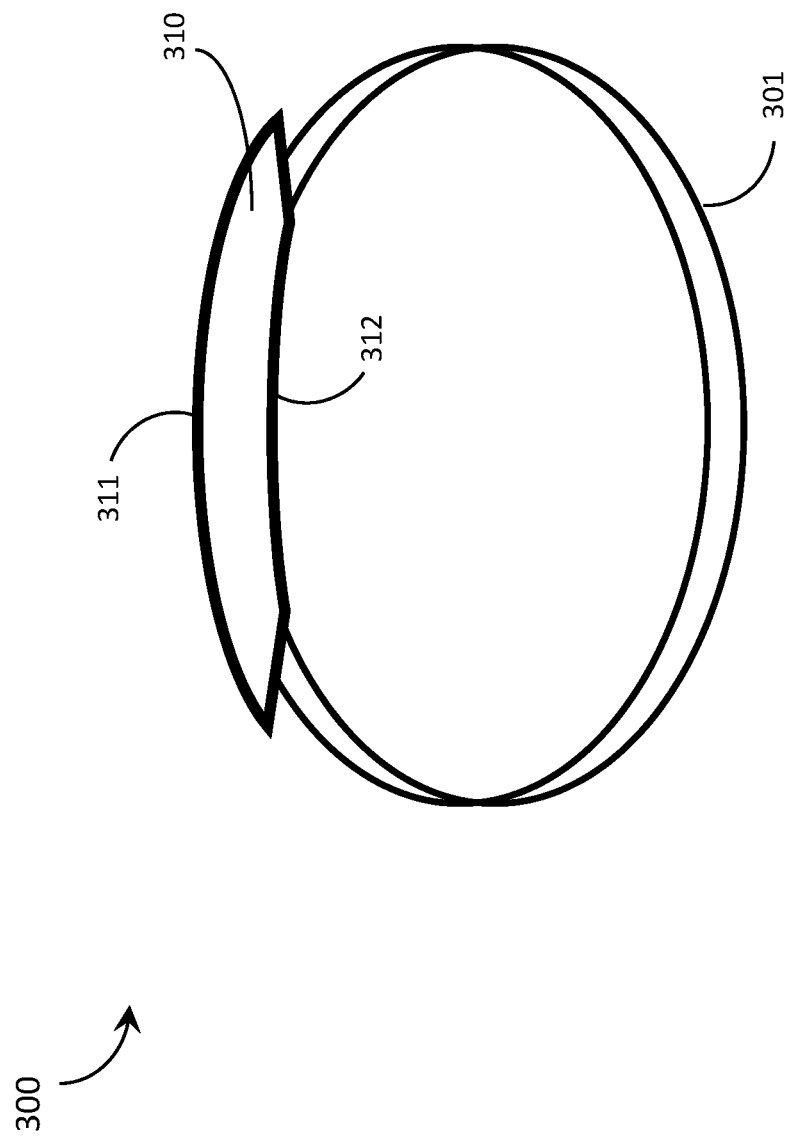
FIG. 3 is a perspective view of an exemplary wristwatch that includes an enhanced back-plate having at least one contact sensor in accordance with the present systems, articles, and methods.

FIG. 3 is a perspective view of an exemplary wristwatch 300 that includes an enhanced back-plate 312 in accordance with the present systems, articles, and methods. Wristwatch 300 includes a wristband 301 that enwraps the wrist of a user to secure wristwatch 300 in position on the user's wrist. Wristband 301 may be elastic, fabric, cloth, leather, or formed of serially-coupled links or any other flexible material and may or may not include a latch, clasp, or other fastening device (not shown in FIG. 3). Wristband 301 may be a traditional watchstrap or an enhanced watchstrap such as watchstrap 101 from FIG. 1, watchstrap 200 from FIGS. 2A and 2B, and/or an enhanced watchstrap as described in U.S. Provisional Patent Application Ser. No. 61/891,694, which is incorporated by reference herein in its entirety. Wristwatch 300 also includes a housing 310 having a top surface 311 and an enhanced back-plate 312 in accordance with the present systems, articles, and methods. Top surface 311 includes a window or display that may provide a means of conveying information to a user (such as the time, etc.) and/or an interface through which the user may program and/or control functions of wristwatch 300. For example, wristwatch 300 may be a traditional analog or mechanical watch, in which case the display of top surface 311 may include a simple sheet of transparent material such as glass or plastic (commonly referred to as the "crystal") forming a window through which the hands of an analog watch face may be seen by the user, or wristwatch 300 may be a traditional digital watch, in which case the display of top surface 311 may include a digital display screen, or wristwatch 300 may be a smart watch, in which case the display of top surface 311 may include a touchscreen. Wristwatch 300 may be substantially similar to any known wristwatch except that wristwatch 300 includes enhanced back-plate 312 providing additional functions and/or capabilities in accordance with the present systems, articles, and methods.

Figure 4:
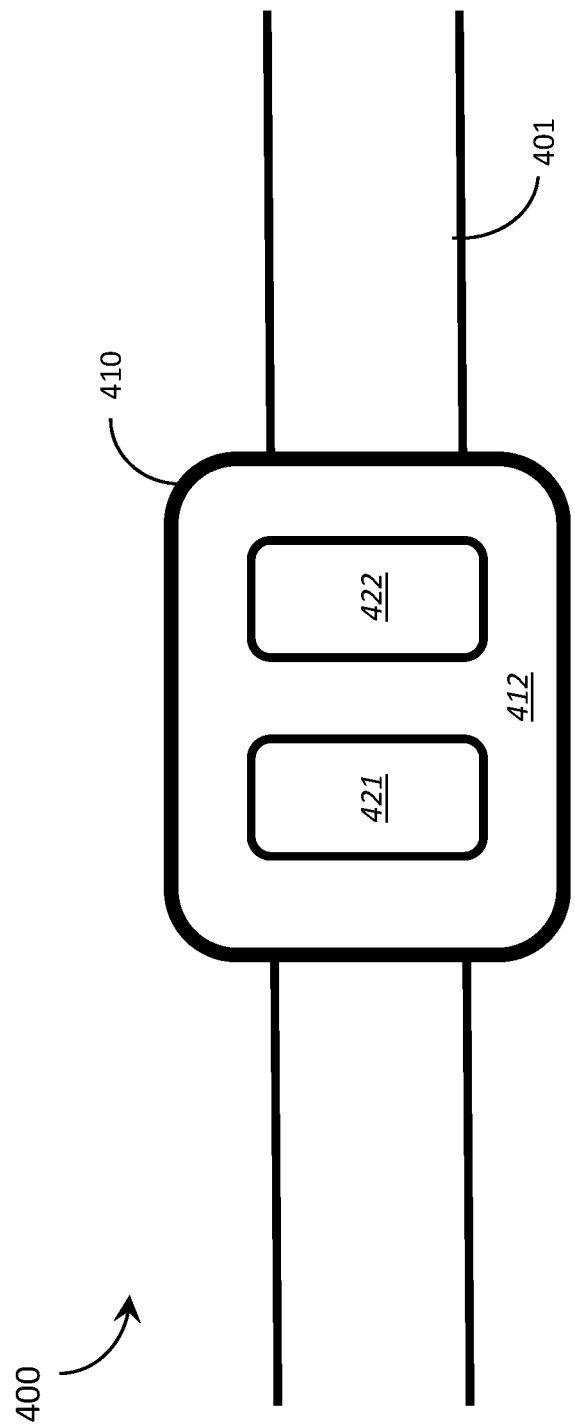
FIG. 4 is a plan view showing an underside of a wristwatch and thereby providing a clearer view (compared to the perspective view of FIG. 3) of a back-plate that is enhanced in accordance with the present systems, articles, and methods.

FIG. 4 is a plan view showing an underside of a wristwatch 400 and thereby providing a clearer view (compared to the perspective view of FIG. 3) of a back-plate 412 that is enhanced in accordance with the present systems, articles, and methods. Wristwatch 400 is substantially similar to wristwatch 300 from FIG. 3 and includes a wristband 401 (similar to wristband 301 from FIG. 3) and a housing 410 (similar to housing 310 from FIG. 3). As FIG. 4 depicts the underside of housing 410, the top surface of housing 410 is not visible in FIG. 4. The top surface of housing 410 may include a window or display, (e.g., an electronic display screen with or without a touchscreen) as seen in virtually all known wristwatch designs.

In accordance with the present systems, articles, and methods, a back-plate for integration with a wristwatch may include at least one contact sensor, and thereby provide enhanced functionality/capability for the wristwatch. Enhanced back-plate 412 includes contact sensors 421 and 422. Contact sensors 421 and 422 may include, for example, EMG sensors, single-frequency capacitive touch sensors, multi-frequency capacitive touch sensors, magnetomyography sensors, acoustic myography sensors, electrocardiography sensors, blood pressure sensors, one or more skin conductance sensor(s), and/or generally any type or types of biometric sensor(s) that are responsive to signals detected through physical contact with the user's skin. In any case, at least one contact sensor (421, 422) is positioned on a first surface of back-plate 412 (i.e., the surface of back-plate 412 that corresponds to the underside of housing 410 in wristwatch 400, hereafter the "contact surface") so that the at least one contact sensor (421, 422) may be positioned proximate (e.g., in physical contact with) the skin of the user.

Back-plate 412 may be sized and dimensioned to mate with any wristwatch design to provide a back-plate therefor and/or an underside thereof. For example, back-plate 412 is illustrated in FIG. 4 as having a substantially square geometry with rounded corners, while in other implementations back-plate 412 may be adapted to provide other geometries, including but not limited to: substantially square, substantially rectangular, substantially circular, and substantially polygonal. Back-plate 412 may be substantially planar (i.e., flat) or, as illustrated in wristwatch 300 of FIG. 3, back-plate 412 may be curved to better accommodate the shape of a user's wrist. In the case of back-plate 412 being curved, a two-dimensional projection of the geometry of back-plate 412 (as seen, for example, in the plan view of FIG. 4) may be any shape designed to accommodate the specifications of a particular wristwatch, including but not limited to: substantially square, substantially rectangular, substantially circular, and substantially polygonal.

The plan view of FIG. 4 depicts the underside of housing 410 in order to show the contact surface of back-plate 412 which carries contact sensors 421 and 422. Back-plate 412 mates with a top surface of housing 410 (either directly, or by mating with at least one sidewall that provides physical coupling between back-plate 412 and a top surface of housing 410) to form a volume having a hollow inner cavity. Additional components of wristwatch 400 (such as, for example, gears, circuitry, a quartz oscillator, a digital processor, and so on) may be included in this inner cavity. In some embodiments, additional components may be carried on a second surface of back-plate 412 that is opposite the first surface (i.e., a "non-contact surface" of back-plate 412 that is at least partially contained within the cavity and does not physically contact the user's skin when worn), such that the additional components carried on the non-contact surface of back-plate 412 are contained in the cavity of housing 410.

Figure 5:
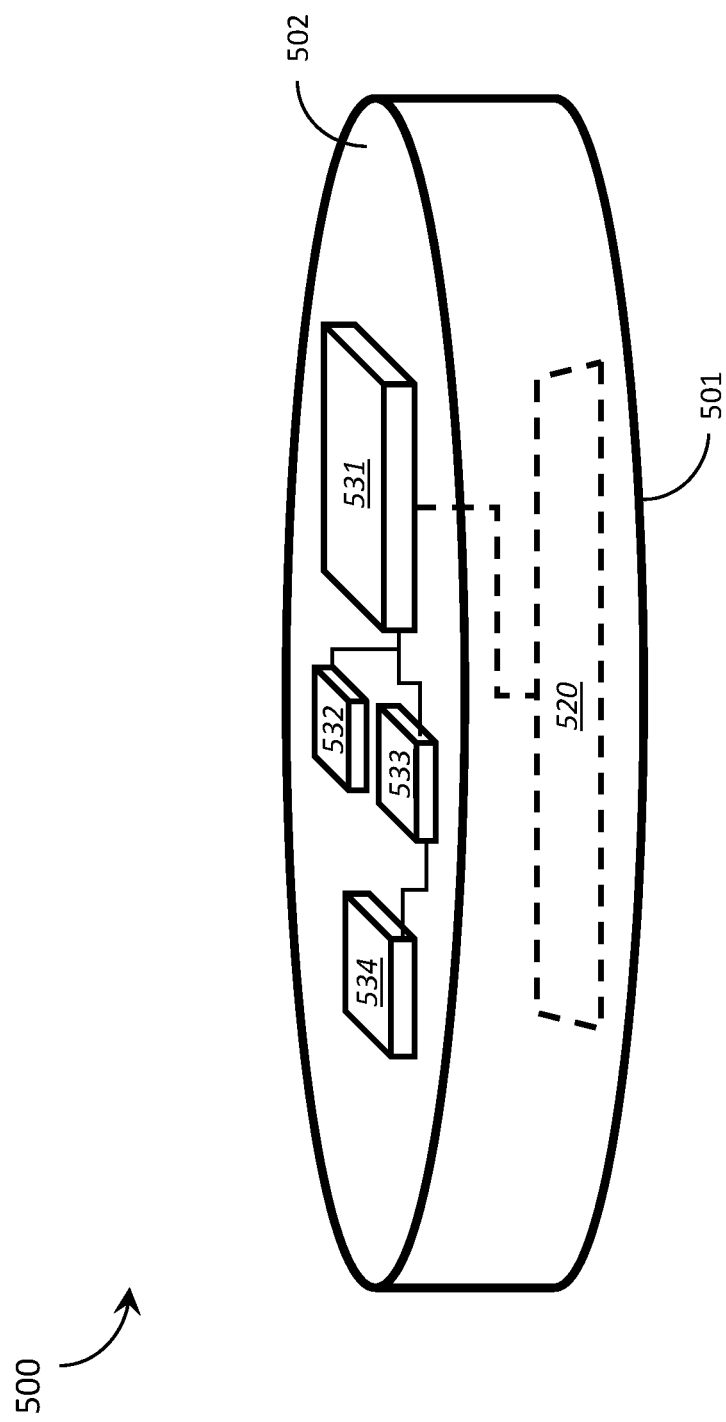
FIG. 5 is a perspective view of an enhanced back-plate for integration into a wristwatch in accordance with the present systems, articles, and methods.

FIG. 5 is a perspective view of a back-plate 500 for integration into a wristwatch in accordance with the present systems, articles, and methods. Back-plate 500 comprises a plate of substantially rigid material having a first surface (i.e., a "contact surface") 501 and a second surface (i.e., a "non-contact surface") 502 opposite the contact surface. The contact surface 501 forms the underside of a housing (e.g., housing 310 from FIG. 3 or 410 from FIG. 4) when integrated into a wristwatch and may be immediately proximate (e.g., in physical contact with) the user's skin during use. In accordance with the present systems, articles, and methods, contact surface 501 includes at least one contact sensor 520 (or at least, an electrode thereof), shown in dotted lines in FIG. 5 to indicate that this component is not actually visible in the view of FIG. 5. The non-contact surface 502 of back-plate 500 carries multiple components 531, 532, 533, and 534, which may take on a variety of different forms depending on the specific implementation. In general, component 531 represents circuitry (e.g., electrical and/or electronic). Circuitry 531 is communicatively coupled to contact sensor 520 by, e.g., an electrically conductive path that extends through back-plate 500. Circuitry 531 may include various circuits, including but not limited to: filtering circuits, amplification circuits, analog-to-digital conversion circuits, routing circuits, and so on. Components 532, 533 and 534 may each include any or all of, for example: a pedometer, an inertial sensor such as an accelerometer and/or a gyroscope, a compass, a GPS unit, a wireless transmitter (on its own or as part of a wireless transceiver) such as Bluetooth™, WiFi™, and/or NFC™, a tethered connector port such as USB, micro-USB, pins or sockets, a battery, a digital processor, and/or an inductive charging element. In applications where one of components 532, 533, and 534 is a wireless transmitter, data may be transmitted from back-plate 500 (e.g., data provided by contact sensor 520) to any receiving device, such as to a smartphone, laptop computer, tablet computer, or desktop computer. At least one of components 532 and/or 533 may include a non-transitory processor-readable storage medium that stores processor-executable contact sensing instructions that, when executed by a processor (e.g., either a processor on-board back-plate 500, for example, component 533, or a processor in a smart watch with which back-plate 500 is integrated through, for example, a tethered connector port), cause the processor to process signals provided by contact sensor 520.

Components 531, 532, 533, and 534 may include at least one of a tethered connector port for communicatively coupling to at least one electrical or electronic component of a wristwatch (e.g., at least one port for galvanically electrically coupling to one or components of the wristwatch with which back-plate 500 is integrated (i.e., components not carried by back-plate 500)) and/or a wireless transmitter (e.g., wireless transceiver) for transmitting data provided by the at least one contact sensor 520 to at least one receiving device, such as a smartphone or other computer. In either case, at least one of components 531, 532, 533, and 534 provides a means through which data provided by the at least one contact sensor 520 is transmitted to a data processing system (either on-board or separate from back-plate 500 or the wristwatch with which back-plate 500 is integrated) for processing, analysis, and/or storage. In the case of components 531, 532, 533, and 534 including a wireless transmitter and no tethered connector port for galvanically interfacing with one or more other components of the wristwatch with which back-plate 500 is integrated, back-plate 500 and all components thereof (i.e., contact sensor 520 and components 531, 532, 533, and 534) may be communicatively isolated from all components of the wristwatch with which back-plate 500 is integrated.

A person of skill in the art will appreciate that FIG. 5 shows four components 531, 532, 533, and 534 on the second "non-contact" surface 502 of back-plate 500, though in practice a back-plate may carry any number of components (including more or fewer than four components) depending on the functionality provided by the back-plate.

As back-plate 500 is designed to be integrated into a wristwatch (e.g., as a component of the wristwatch integrated into the wristwatch during manufacturing thereof), the non-contact surface 502 of back-plate 500 may include a communication terminal 534 (such as a tethered connector port) to communicatively couple with other electrical and/or electronic circuitry of the wristwatch. For example, communication terminal 534 may communicatively couple with an electronic display screen (e.g., a touchscreen) of the wristwatch and/or communication terminal 534 may communicatively couple with any electrical component contained within the cavity of the housing of the wristwatch. Communication terminal 534 may include any type of electrical or optical connector, including but not limited to a zero insertion force connector, a socket, a set of pins or bonding pads, a micro-USB connector, and so on. Thus, back-plate 500 may be integrated into any known wristwatch design by substituting for the existing back-plate in the design and, optionally, communicatively coupling to circuitry in the existing design (if such circuitry does exist) through communication terminal 534.

The various embodiments of wristwatch back-plates described herein are generic in that they can be adapted to integrate with any known wristwatch design by, for example, sizing and dimensioning the plate to mate with existing wristwatch components (such as the display window or screen with/without associated sidewalls) and, optionally, communicatively coupling the electrical components of the back-plate to existing electrical components of the wristwatch (if such electrical components exist) through a dedicated communication terminal (e.g., terminal 534). In this way, the enhanced back-plates described herein introduce new components and associated functionality/capability into existing wristwatch designs, thereby transforming virtually any traditional wristwatch design into a smart watch and/or enhancing the functions and capabilities of virtually any smart watch design.

As previously described, in accordance with the present systems, articles, and methods at least one contact sensor may be incorporated into a wearable device that otherwise provides some other functionality (such as a wristwatch) or into a dedicated wearable electronic device that is specifically designed to provide contact sensing functionality. For example, a wearable electronic device may be fitted with multiple EMG sensors that are responsive to muscle activity for the purpose of enabling gesture-based control in a human-electronics interface as described in U.S. Provisional Patent Application Ser. No. 61/752,226 (now U.S. Non-Provisional patent application Ser. No. 14/155,107), U.S. Provisional Patent Application Ser. No. 61/857,105 (now U.S. Non-Provisional patent application Ser. No. 14/335,668), and/or U.S. Provisional Patent Application Ser. No. 61/860,063 (now U.S. Non-Provisional patent application Ser. No. 14/276,575), each of which is incorporated by reference herein in its entirety, and/or in any of the other US Provisional Patent Applications incorporated by reference herein. In accordance with the present systems, articles, and methods, such a wearable EMG device may be adapted to include at least one capacitive touch sensor, such as at least one single-frequency capacitive touch sensor and/or at least one multi-frequency capacitive touch sensor.

Figure 6:
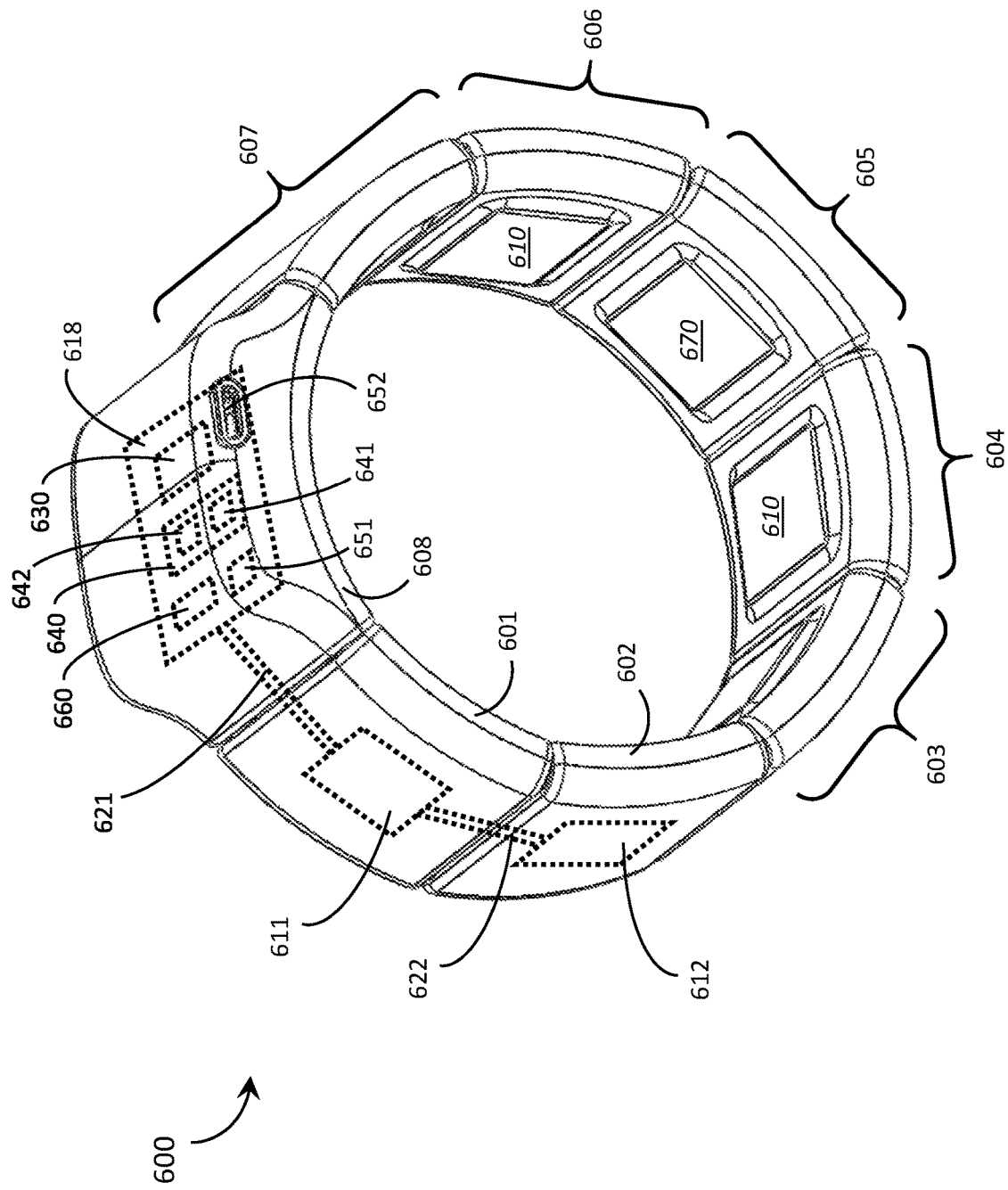
FIG. 6 is a perspective view of an exemplary wearable electromyography ("EMG") device that includes two contact sensor types: a set of capacitive EMG sensors and at least one capacitive touch sensor in accordance with the present systems, articles, and methods.

FIG. 6 is a perspective view of an exemplary wearable EMG device 600 that includes two contact sensor types: a set of capacitive EMG sensors 610 (only two called out to reduce clutter) and at least one capacitive touch sensor 670 in accordance with the present systems, articles, and methods. Exemplary wearable EMG device 600 may, for example, form part of a human-electronics interface. Exemplary wearable EMG device 600 is an armband designed to be worn on the forearm of a user, though a person of skill in the art will appreciate that the teachings described herein may readily be applied in wearable EMG devices designed to be worn elsewhere on the body of the user, including without limitation: on the upper arm, wrist, hand, finger, leg, foot, torso, or neck of the user.

Device 600 includes a set of eight pod structures 601, 602, 603, 604, 605, 606, 607, and 608 that form physically coupled links of the wearable EMG device 600. Each pod structure in the set of eight pod structures 601, 602, 603, 604, 605, 606, 607, and 608 is positioned adjacent and in between two other pod structures in the set of eight pod structures such that the set of pod structures forms a perimeter of an annular or closed loop configuration. For example, pod structure 601 is positioned adjacent and in between pod structures 602 and 608 at least approximately on a perimeter of the annular or closed loop configuration of pod structures, pod structure 602 is positioned adjacent and in between pod structures 601 and 603 at least approximately on the perimeter of the annular or closed loop configuration, pod structure 603 is positioned adjacent and in between pod structures 602 and 604 at least approximately on the perimeter of the annular or closed loop configuration, and so on. Each of pod structures 601, 602, 603, 604, 605, 606, 607, and 608 is physically coupled to the two adjacent pod structures by at least one adaptive coupler (not visible in FIG. 6). For example, pod structure 601 is physically coupled to pod structure 608 by an adaptive coupler and to pod structure 602 by an adaptive coupler. As described previously, the term "adaptive coupler" is used throughout this specification and the appended claims to denote a system, article or device that provides flexible, adjustable, modifiable, extendable, extensible, or otherwise "adaptive" physical coupling.

Adaptive coupling is physical coupling between two objects that permits limited motion of the two objects relative to one another. An example of an adaptive coupler is an elastic material such as an elastic band. Thus, each of pod structures 601, 602, 603, 604, 605, 606, 607, and 608 in the set of eight pod structures may be adaptively physically coupled to the two adjacent pod structures by at least one elastic band. The set of eight pod structures may be physically bound in the annular or closed loop configuration by a single elastic band that couples over or through all pod structures or by multiple separate elastic bands that couple between adjacent pairs of pod structures or between groups of adjacent pairs of pod structures. Device 600 is depicted in FIG. 6 with the at least one adaptive coupler completely retracted and contained within the eight pod structures 601, 602, 603, 604, 605, 606, 607, and 608 (and therefore the at least one adaptive coupler is not visible in FIG. 6).

Throughout this specification and the appended claims, the term "pod structure" is used to refer to an individual link, segment, pod, section, structure, component, etc. of a wearable EMG device. For the purposes of the present systems, articles, and methods, an "individual link, segment, pod, section, structure, component, etc." (i.e., a "pod structure") of a wearable EMG device is characterized by its ability to be moved or displaced relative to another link, segment, pod, section, structure component, etc. of the wearable EMG device. For example, pod structures 601 and 602 of device 600 can each be moved or displaced relative to one another within the constraints imposed by the adaptive coupler providing adaptive physical coupling therebetween. The desire for pod structures 601 and 602 to be movable/displaceable relative to one another specifically arises because device 600 is a wearable EMG device that advantageously accommodates the movements of a user and/or different user forms.

Device 600 includes eight pod structures 601, 602, 603, 604, 605, 606, 607, and 608 that form physically coupled links thereof. Wearable EMG devices employing pod structures (e.g., device 600) are used herein as exemplary wearable EMG device designs, while the present systems, articles, and methods may be applied to wearable EMG devices that do not employ pod structures (or that employ any number of pod structures). Thus, throughout this specification, descriptions relating to pod structures (e.g., functions and/or components of pod structures) should be interpreted as being applicable to any wearable EMG device design, even wearable EMG device designs that do not employ pod structures (except in cases where a pod structure is specifically recited in a claim).

In exemplary device 600 of FIG. 6, each of pod structures 601, 602, 603, 604, 605, 606, 607, and 608 comprises a respective housing having a respective inner volume. Each housing may be formed of substantially rigid material and may be optically opaque. As previously described, throughout this specification and the appended claims, the term "rigid" as in, for example, "substantially rigid material," is used to describe a material that has an inherent tendency to maintain or restore its shape and resist malformation/deformation under the moderate stresses and strains typically encountered by a wearable electronic device.

Details of the components contained within the housings (i.e., within the inner volumes of the housings) of pod structures 601, 602, 603, 604, 605, 606, 607, and 608 are not visible in FIG. 6. To facilitate descriptions of exemplary device 600, some internal components are depicted by dashed lines in FIG. 6 to indicate that these components are contained in the inner volume(s) of housings and may not normally be actually visible in the view depicted in FIG. 6, unless a transparent or translucent material is employed to form the housings. For example, any or all of pod structures 601, 602, 603, 604, 605, 606, 607, and/or 608 may include circuitry (i.e., electrical and/or electronic circuitry). In FIG. 6, a first pod structure 601 is shown containing circuitry 611 (i.e., circuitry 611 is contained in the inner volume of the housing of pod structure 601), a second pod structure 602 is shown containing circuitry 612, and a third pod structure 608 is shown containing circuitry 618. The circuitry in any or all pod structures may be communicatively coupled to the circuitry in at least one adjacent pod structure by at least one respective communicative pathway (e.g., by at least one electrically conductive pathway and/or by at least one optical pathway). For example, FIG. 6 shows a first set of communicative pathways 621 providing communicative coupling between circuitry 618 of pod structure 608 and circuitry 611 of pod structure 601, and a second set of communicative pathways 622 providing communicative coupling between circuitry 611 of pod structure 601 and circuitry 612 of pod structure 602. Communicative coupling between circuitries of adjacent pod structures in device 600 may advantageously include systems, articles, and methods for signal routing as described in U.S. Provisional Patent Application Ser. No. 61/866,960 (now U.S. Non-Provisional patent application Ser. No. 14/461,044), which is incorporated by reference herein in its entirety.

Each individual pod structure within a wearable EMG device may perform a particular function, or particular functions. For example, in device 600, each of pod structures 601, 602, 603, 604, 605, 606, and 607 includes a respective contact sensor 610 or 670; thus, each of pod structures 601, 602, 603, 604, 605, 606, and 607 may be referred to as a respective "sensor pod." Device 600 employs at least two different types of contact sensors: capacitive EMG sensors 610 and at least one capacitive touch sensor 670. In the illustrated example, sensor pods 601, 602, 603, 604, 606, and 607 each include a respective capacitive EMG sensor 610 responsive to (e.g., to detect) muscle activity of a user that provides electrical signals in response to detected muscle activity, while sensor pod 605 includes a capacitive touch sensor 670 (e.g., a single-frequency capacitive touch sensor or a multi-frequency capacitive touch sensor) responsive to (e.g., to detect) physical contact between a user and an object (i.e., when and/or how a user is physically touching an object) and that provides signals in response to detected physical contact. Throughout this specification and the appended claims, the term "sensor pod" is used to denote an individual pod structure that includes at least one contact sensor.

Pod structure 608 of device 600 includes a processor 630 that processes the signals provided by the contact sensors 610 and 670 of sensor pods 601, 602, 603, 604, 605, 606, and 607. Pod structure 608 may therefore be referred to as a "processor pod." Throughout this specification and the appended claims, the term "processor pod" is used to denote an individual pod structure that includes at least one processor to process signals. The processor may be any type of processor, including but not limited to: a digital microprocessor or microcontroller, an application-specific integrated circuit (ASIC), a field-programmable gate array (FPGA), a digital signal processor (DSP), a graphics processing unit (GPU), a programmable gate array (PGA), a programmable logic unit (PLU), or the like, that analyzes or otherwise processes the signals to determine at least one output, action, or function based on the signals. A person of skill in the art will appreciate that implementations that employ a digital processor (e.g., a digital microprocessor or microcontroller, a DSP, etc.) may advantageously include a non-transitory processor-readable storage medium or memory 640 communicatively coupled thereto and storing processor-executable instructions that control the operations thereof, whereas implementations that employ an ASIC, FPGA, or analog processor may or may not include a non-transitory processor-readable storage medium.

As used throughout this specification and the appended claims, the terms "sensor pod" and "processor pod" are not necessarily exclusive. A single pod structure may satisfy the definitions of both a "sensor pod" and a "processor pod" and may be referred to as either type of pod structure. For greater clarity, the term "sensor pod" is used to refer to any pod structure that includes a contact sensor and performs at least the function(s) of a sensor pod, and the term processor pod is used to refer to any pod structure that includes a processor and performs at least the function(s) of a processor pod. In device 600, processor pod 608 includes a capacitive EMG sensor 610 (not visible in FIG. 6) to sense, measure, transduce or otherwise detect muscle activity of a user, so processor pod 608 could be referred to as a sensor pod. However, in exemplary device 600, processor pod 608 is the only pod structure that includes a processor 630, thus processor pod 608 is the only pod structure in exemplary device 600 that can be referred to as a processor pod. The processor 630 in processor pod 608 also processes the EMG signals provided by the capacitive EMG sensor 610 of processor pod 608. In alternative embodiments of device 600, multiple pod structures may include processors, and thus multiple pod structures may serve as processor pods. Similarly, some pod structures may not include contact sensors, and/or some contact sensors and/or processors may be laid out in other configurations that do not involve pod structures.

In device 600, processor 630 includes and/or is communicatively coupled to a non-transitory processor-readable storage medium or memory 640. Memory 640 stores at least two sets of processor-executable instructions: processor-executable gesture identification instructions 641 that, when executed by processor 630, cause processor 630 to process the EMG signals from capacitive EMG sensors 610 and identify a gesture to which the EMG signals correspond, and processor-executable touch sensing instructions 642 that, when executed by processor 630, cause processor 630 to process the signals from the at least one capacitive touch sensor 670. For communicating with a separate electronic device (not shown), wearable EMG device 600 includes at least one communication terminal. As examples, device 600 includes a first communication terminal 651 and a second communication terminal 652. First communication terminal 651 includes a wireless transmitter (i.e., a wireless communication terminal) and second communication terminal 652 includes a tethered connector port 652. Wireless transmitter 651 may include, for example, a Bluetooth® transmitter (or similar) and connector port 652 may include a Universal Serial Bus port, a mini-Universal Serial Bus port, a micro-Universal Serial Bus port, a SMA port, a THUNDERBOLT® port, or the like.

For some applications, device 600 may also include at least one inertial sensor 660 (e.g., an inertial measurement unit, or "IMU," that includes at least one accelerometer and/or at least one gyroscope) responsive to (e.g., to detect, sense, or measure) motion effected by a user and that provides signals in response to detected motion. Signals provided by inertial sensor 660 may be combined or otherwise processed in conjunction with signals provided by capacitive EMG sensors 610 and/or capacitive touch sensor(s) 670.

Throughout this specification and the appended claims, the term "provide" and variants such as "provided" and "providing" are frequently used in the context of signals. For example, a contact sensor is described as "providing at least one signal" and an inertial sensor is described as "providing at least one signal." Unless the specific context requires otherwise, the term "provide" is used in a most general sense to cover any form of providing a signal, including but not limited to: relaying a signal, outputting a signal, generating a signal, routing a signal, creating a signal, transducing a signal, and so on. For example, a capacitive EMG sensor may include at least one electrode that capacitively couples to electrical signals from muscle activity. This capacitive coupling induces a change in a charge or electrical potential of the at least one electrode which is then relayed through the sensor circuitry and output, or "provided," by the sensor. Thus, the capacitive EMG sensor may "provide" an electrical signal by relaying an electrical signal from a muscle (or muscles) to an output (or outputs). In contrast, an inertial sensor may include components (e.g., piezoelectric, piezoresistive, capacitive, etc.) that are used to convert physical motion into electrical signals. The inertial sensor may "provide" an electrical signal by detecting motion and generating an electrical signal in response to the motion.

As previously described, each of pod structures 601, 602, 603, 604, 605, 606, 607, and 608 may include circuitry (i.e., electrical and/or electronic circuitry). FIG. 6 depicts circuitry 611 inside the inner volume of sensor pod 601, circuitry 612 inside the inner volume of sensor pod 602, and circuitry 618 inside the inner volume of processor pod 618. The circuitry in any or all of pod structures 601, 602, 603, 604, 605, 606, 607 and 608 (including circuitries 611, 612, and 618) may include any or all of: an amplification circuit to amplify electrical signals provided by at least one contact sensor 610, 670; a filtering circuit to remove unwanted signal frequencies from the signals provided by at least one contact sensor 610, 670; and/or an analog-to-digital conversion circuit to convert analog signals into digital signals. Device 600 may also include at least one battery (not shown in FIG. 6) to provide a portable power source for device 600.

Signals that are provided by contact sensors 610, 670 in device 600 are routed to processor pod 608 for processing by processor 630. To this end, device 600 employs a set of communicative pathways (e.g., 621 and 622) to route the signals that are output by sensor pods 601, 602, 603, 604, 605, 606, and 607 to processor pod 608. Each respective pod structure 601, 602, 603, 604, 605, 606, 607, and 608 in device 600 is communicatively coupled to, over, or through at least one of the two other pod structures between which the respective pod structure is positioned by at least one respective communicative pathway from the set of communicative pathways. Each communicative pathway (e.g., 621 and 622) may be realized in any communicative form, including but not limited to: electrically conductive wires or cables, ribbon cables, fiber-optic cables, optical/photonic waveguides, electrically conductive traces carried by a rigid printed circuit board, electrically conductive traces carried by a flexible printed circuit board, and/or electrically conductive traces carried by a stretchable printed circuit board.

Device 600 from FIG. 6 represents an example of a wearable EMG device that incorporates at least one capacitive touch sensor 670 (e.g., at least one single-frequency capacitive touch sensor and/or at least one multi-frequency capacitive touch sensor) in accordance with the teachings of the present systems, articles, and methods, though the teachings of the present systems, articles, and methods are applicable to any wearable electronic device. In most applications, it is advantageous for the wearable device to include an on-board processor for processing contact sensor signals as described herein, but a person of skill in the art will appreciate that at least some of the acts involved in processing contact sensor signals may be performed by a processor that is separate from the wearable device (e.g., a processor in a computer that receives signals from the wearable device).

As previously described, incorporating at least one capacitive touch sensor into a wearable device (such as a wristwatch of a wearable EMG device) can enable the device to detect physical contact between a user and an object (i.e., when and/or how a user is physically interacting with an object) and to provide signals in response to the detected physical contact. Furthermore, at least two capacitive touch sensors worn on different parts of the user's body (e.g., in a first wearable device, such as a wearable EMG device, worn on a first arm of the user and a second wearable device, such as a wristwatch or a second wearable EMG device, worn on a second arm of the user) can be used to detect poses, postures, gestures, and/or other configurations performed by the user as described in Sato et al. Such poses, postures, gestures, and/or other configurations detected by at least two capacitive touch sensors worn on different parts of the user's body (similar to, for example, U.S. Provisional Patent Application Ser. No. 61/874,846; now U.S. Non-Provisional patent application Ser. No. 14/476,093) may facilitate gesture identification and/or expand the library of gestures available to a user in, for example, a human-electronics interface employing gesture-based control.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "non-transitory processor-readable medium" can be any element that can store the program associated with logic and/or information for use by or in connection with the instruction execution system, apparatus, and/or device. The processor-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet, including but not limited to U.S. Non-Provisional patent application Ser. No. 14/505,836, U.S. Provisional Patent Application Ser. No. 61/897,097, U.S. Provisional Patent Application Ser. No. 61/752,226 (now U.S. Non-Provisional patent application Ser. No. 14/155,107), U.S. Provisional Patent Application Ser. No. 61/768,322 (now U.S. Non-Provisional patent application Ser. No. 14/186,889), U.S. Provisional Patent Application Ser. No. 61/771,500 (now U.S. Non-Provisional patent application Ser. No. 14/194,252), U.S. Provisional Patent Application Ser. No. 61/857,105 (now U.S. Non-Provisional patent application Ser. No. 14/335,668), U.S. Provisional Patent Application Ser. No. 61/860,063 (now U.S. Non-Provisional patent application Ser. No. 14/276,575), U.S. Provisional Patent Application Ser. No. 61/866,960 (now U.S. Non-Provisional patent application Ser. No. 14/461,044), U.S. Provisional Patent Application Ser. No. 61/869,526 (now U.S. Non-Provisional patent application Ser. No. 14/465,194), U.S. Provisional Patent Application Ser. No. 61/874,846 (now U.S. Non-Provisional patent application Ser. No. 14/476,093), U.S. Provisional Patent Application Ser. No. 61/872,569 (now U.S. Non-Provisional patent application Ser. No. 14/471,982), U.S. Provisional Patent Application Ser. No. 61/881,064 (now U.S. Non-Provisional patent application Ser. No. 14/494,274), U.S. Provisional Patent Application Ser. No. 61/894,263, U.S. Provisional Patent Application Ser. No. 61/887,193, U.S. Provisional Patent Application Ser. No. 61/887,812, and U.S. Provisional Patent Application Ser. No. 61/891,694, are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A wearable electronic device comprising:
one or more contact surfaces that are substantially in contact with the user's wrist when the wearable electronic device is worn by the user, the one or more contact surfaces comprising:
one or more electromyography (EMG) sensors responsive to muscle activity corresponding to hand poses performed by the user while wearing the wearable electronic device; and
one or more capacitive sensors responsive to a body capacitance of the user corresponding to physical contact between the user and an object;
at least one processor; and
physical memory comprising processor-executable instructions that, when executed by the at least one processor, cause the at least one processor to:
identify a pose of a hand of the user based on signals provided by the one or more EMG sensors; and
identify a physical contact between the hand of the user and the object based on signals provided by the one or more capacitive sensors.

2. The wearable electronic device of claim 1 wherein the one or more capacitive sensors include a single-frequency capacitive touch sensor that is substantially in contact with the user's wrist when the wearable electronic device is worn by the user.

3. The wearable electronic device of claim 1, further comprising at least one communication terminal communicatively coupled to the processor, the at least one communication terminal operable to transmit touch-based user-interface signals to a wearable head display device, wherein the touch-based user-interface signals are based on signals provided by the one or more EMG sensors.

4. The wearable electronic device of claim 1, further comprising one or more inertial sensors communicatively coupled to the processor, the one or more inertial sensors responsive to motion corresponding to a gesture of the hand of the user and to provide at least one signal in response thereto, wherein the processor-executable instructions further cause the processor to:
recognize the gesture performed by the user based on signals provided by the one or more EMG sensors; and
determine a motion aspect of the gesture based on at least one signal provided by the one or more inertial sensors.

5. The wearable electronic device of claim 1 wherein the processor-executable instructions comprise:
instructions that, when executed by the processor, cause the processor to determine a set of values from the signals provided by the one or more EMG sensors;
instructions that, when executed by the processor, cause the processor to rank each value in the set of values, wherein ranking each value in the set of values includes assigning a rank number to each value in the set of values;
instructions that, when executed by the processor, cause the processor to generate a permutation of a digit string based at least in part on the rank number of each value in the set of values; and
instructions that, when executed by the processor, cause the processor to identify the pose based at least in part on the permutation of the digit string.

6. The wearable electronic device of claim 1 wherein the processor-executable instructions further cause the processor to detect, using the signals provided by the one or more capacitive sensors, how the hand of the user physically touches the object.

7. The wearable electronic device of claim 1 wherein the processor-executable instructions further cause the processor to detect, using the signals provided by the one or more capacitive sensors, how the hand of the user is physically interacting with the object.

8. The wearable electronic device of claim 1 further comprising at least one communication terminal communicatively coupled to the processor, the at least one communication terminal operable to transmit touch-based user-interface signals to a wearable head display device, wherein the touch-based user-interface signals are based on signals provided by the one or more capacitive sensors.

9. The wearable electronic device of claim 1 wherein the one or more capacitive sensors include a multi-frequency capacitive touch sensor that is substantially in contact with the user's wrist when the wearable electronic device is worn by the user.

10. The wearable electronic device of claim 1 wherein the one or more capacitive sensors include a swept frequency capacitive touch sensor that is substantially in contact with the user's wrist when the wearable electronic device is worn by the user.

11. The wearable electronic device of claim 1 further comprising a plurality of individual pod structures, wherein:
the wearable electronic device includes one or more non-contact surfaces that are substantially not in contact with a user's wrist when the wearable electronic device is worn by the user;
each of the plurality of individual pod structures includes one of the one or more non-contact surfaces and one of the one or more contact surfaces;
a first one of the plurality of individual pod structures includes one of the one or more EMG sensors; and
a second one of the plurality of individual pod structures includes one of the one or more capacitive sensors.

12. A watchstrap for integration into a wristwatch, the watchstrap comprising:
one or more contact surfaces that are substantially in contact with the user's wrist when the watchstrap is worn by the user, the one or more contact surfaces comprising:
one or more electromyography (EMG) sensors responsive to muscle activity corresponding to hand poses performed by the user while wearing the wearing the watchstrap; and
one or more capacitive sensors responsive to a body capacitance of the user corresponding to physical contact between the user and an object; and
a set of communication pathways from the one or more EMG sensors and the one or more capacitive sensors to at least one processor, wherein the at least one processor accesses physical memory comprising processor-executable instructions that, when executed by the at least one processor, cause the at least one processor to:
identify a pose of a hand of the user based on signals provided by the one or more EMG sensors, the pose of the hand comprising relative positions of two or more fingers of the hand; and
identify a physical contact between the hand of the user and the object based on signals provided by the one or more capacitive sensors.

13. The watchstrap of claim 12 further comprising a plurality of individual pod structures, wherein:
the watchstrap includes one or more non-contact surfaces that are substantially not in contact with a user's wrist when the watchstrap is worn by the user;
each of the plurality of individual pod structures includes one of the one or more non-contact surfaces and one of the one or more contact surfaces;
a first one of the plurality of individual pod structures includes one of the one or more EMG sensors; and
a second one of the plurality of individual pod structures includes one of the one or more capacitive sensors.

14. The watchstrap of claim 12 wherein the processor-executable instructions further cause the processor to detect, using the signals provided by the one or more capacitive sensors, how the hand of the user physically touches the object.

15. The watchstrap of claim 12 further comprising a plurality of individual pod structures, wherein:
the watchstrap includes one or more non-contact surfaces that are substantially not in contact with a user's wrist when the watchstrap is worn by the user;
each of the plurality of individual pod structures includes one of the one or more non-contact surfaces and one of the one or more contact surfaces;
a first one of the plurality of individual pod structures includes one of the one or more EMG sensors;
a second one of the plurality of individual pod structures includes one of the one or more capacitive sensors;
a third one of the plurality of individual pod structures includes an inertial sensor communicatively coupled to the processor, the inertial sensor responsive to motion corresponding to a gesture of the hand of the user and to provide at least one signal in response thereto, wherein the processor-executable instructions further cause the processor to identify the gesture based at least in part on both signals provided by the one or more EMG sensors and at least one signal provided by the inertial sensor.

16. A back-plate for integration into a wristwatch, the back-plate comprising:
one or more contact surfaces that are substantially in contact with the user's wrist when the wristwatch is worn by the user, the one or more contact surfaces comprising:
one or more electromyography (EMG) sensors responsive to muscle activity corresponding to hand poses performed by the user while wearing the wristwatch; and
one or more capacitive sensors responsive to a body capacitance of the user corresponding to physical contact between the user and an object;
at least one processor; and
physical memory comprising processor-executable instructions that, when executed by the at least one processor, cause the at least one processor to:
identify a pose of a hand of the user based on signals provided by the one or more EMG sensors, the pose of the hand comprising relative positions of two or more fingers of the hand; and
identify a physical contact between the hand of the user and the object based on signals provided by the one or more capacitive sensors.

17. The back-plate of claim 16 wherein the processor-executable instructions comprise:
instructions that, when executed by the processor, cause the processor to determine a set of values from the signals provided by the one or more EMG sensors;
instructions that, when executed by the processor, cause the processor to rank each value in the set of values, wherein ranking each value in the set of values includes assigning a rank number to each value in the set of values;
instructions that, when executed by the processor, cause the processor to generate a permutation of a digit string based at least in part on the rank number of each value in the set of values; and
instructions that, when executed by the processor, cause the processor to identify the pose based at least in part on the permutation of the digit string.

18. The back-plate of claim 16 wherein the processor-executable instructions further cause the processor to detect, using the signals provided by the one or more capacitive sensors, how the hand of the user physically touches the object.

19. The back-plate of claim 16 wherein the processor-executable instructions further cause the processor to detect, using the signals provided by the one or more capacitive sensors, how the hand of the user is physically interacting with the object.

20. The back-plate of claim 16 further comprising at least one communication terminal communicatively coupled to the processor, the at least one communication terminal operable to transmit touch-based user-interface signals to a wearable head display device, wherein the touch-based user-interface signals are based on signals provided by the one or more capacitive sensors.

\* \* \* \* \*